United States Patent
Yen

(10) Patent No.: US 11,021,584 B2
(45) Date of Patent: Jun. 1, 2021

(54) MICROPOROUS SHEET PRODUCT AND METHODS FOR MAKING AND USING THE SAME

(71) Applicant: William Winchin Yen, Acton, MA (US)

(72) Inventor: William Winchin Yen, Acton, MA (US)

(*) Notice: Subject to any disclaimer, the term of this patent is extended or adjusted under 35 U.S.C. 154(b) by 0 days.

(21) Appl. No.: 15/327,218

(22) PCT Filed: Aug. 20, 2015

(86) PCT No.: PCT/US2015/046060
§ 371 (c)(1),
(2) Date: Jan. 18, 2017

(87) PCT Pub. No.: WO2016/028989
PCT Pub. Date: Feb. 25, 2016

(65) Prior Publication Data
US 2017/0166716 A1   Jun. 15, 2017

Related U.S. Application Data

(60) Provisional application No. 62/040,257, filed on Aug. 21, 2014, provisional application No. 62/112,904, filed on Feb. 6, 2015.

(51) Int. Cl.
*B32B 27/32* (2006.01)
*C08J 5/18* (2006.01)
(Continued)

(52) U.S. Cl.
CPC ............ *C08J 5/18* (2013.01); *B65B 25/001* (2013.01); *B65D 81/24* (2013.01);
(Continued)

(58) Field of Classification Search
CPC .......... H01M 2/14; H01M 2/16; H01M 2/164; H01M 2/1653; H01M 2/166; B32B 3/00; B32B 3/26; B32B 3/266
(Continued)

(56) References Cited

U.S. PATENT DOCUMENTS

| 2,806,256 A | 9/1957 | Smith-Johannsen |
| 3,351,495 A | 11/1967 | Larsen et al. |

(Continued)

FOREIGN PATENT DOCUMENTS

| CN | 1972986 A | 5/2007 |
| CN | 101267934 A | 9/2008 |

(Continued)

OTHER PUBLICATIONS

Brandrup, Polymer Handbook, 1999, John Wiley & Sons, pp. 688-713 (Year: 1999).*

(Continued)

*Primary Examiner* — Zachary M Davis
(74) *Attorney, Agent, or Firm* — Kriegsman & Kriegsman

(57) ABSTRACT

Microporous sheet product and methods of making and using the same. In one embodiment, the microporous sheet product is made by a process that includes melt-extruding a sheet material using an extrusion mixture that includes a thermoplastic polymer, a superabsorbent polymer, and a compatibilizing agent. After extrusion, the compatibilizing agent may be removed from the sheet material. When the sheet product is imbibed with a polar or ion-containing liquid, the superabsorbent polymer swells, causing a reduction in the pore size of the sheet product. The exposure also causes some of the superabsorbent polymer to migrate to the exterior of the microporous sheet product. The microporous sheet product may be used, for example, as a battery separator, as a food packaging material, as a diffusion barrier (Continued)

in the ultrafiltration of colloidal matter, and in disposable garments.

46 Claims, 4 Drawing Sheets

(51) Int. Cl.
  *H01M 50/411* (2021.01)
  *B65B 25/00* (2006.01)
  *B65D 81/24* (2006.01)

(52) U.S. Cl.
  CPC ........ *H01M 50/411* (2021.01); *C08J 2323/02* (2013.01); *C08J 2323/06* (2013.01); *C08J 2377/02* (2013.01); *C08J 2400/14* (2013.01); *C08J 2423/08* (2013.01); *C08J 2431/04* (2013.01)

(58) Field of Classification Search
  USPC .................................................. 428/131, 134
  See application file for complete search history.

(56) References Cited

U.S. PATENT DOCUMENTS

| | | | |
|---|---|---|---|
| 3,407,253 A | 10/1968 | Yoshimura et al. | |
| 3,426,754 A | 2/1969 | Bierenbaum et al. | |
| 3,512,997 A | 5/1970 | Cohly et al. | |
| 3,558,764 A | 1/1971 | Isaacson et al. | |
| 3,679,538 A | 7/1972 | Druin et al. | |
| 3,679,540 A | 7/1972 | Zimmerman et al. | |
| 3,801,404 A | 4/1974 | Druin et al. | |
| 3,843,761 A | 10/1974 | Bierenbaum et al. | |
| 3,920,588 A | 11/1975 | Traeubel et al. | |
| 3,967,978 A | 7/1976 | Honda et al. | |
| 4,024,323 A | 5/1977 | Versteegh | |
| 4,100,324 A | 7/1978 | Anderson et al. | |
| 4,138,459 A | 2/1979 | Brazinsky et al. | |
| 4,210,709 A | 7/1980 | Doi et al. | |
| 4,224,394 A | 9/1980 | Schmidt | |
| 4,247,498 A | 1/1981 | Castro | |
| 4,279,979 A | 7/1981 | Benson et al. | |
| 4,283,442 A | 8/1981 | Machi et al. | |
| 4,285,751 A | 8/1981 | Feinberg et al. | |
| 4,287,276 A | 9/1981 | Lundquist, Jr. et al. | |
| 4,288,503 A | 9/1981 | Goldberg | |
| 4,330,602 A | 5/1982 | O'Rell et al. | |
| 4,346,142 A | 8/1982 | Lazear | |
| 4,427,737 A | 1/1984 | Cilento et al. | |
| 4,522,902 A | 6/1985 | Minchak et al. | |
| 4,539,256 A | 9/1985 | Shipman | |
| 4,614,575 A | 9/1986 | Juda et al. | |
| 4,650,730 A | 3/1987 | Lundquist et al. | |
| 4,699,857 A | 10/1987 | Giovannoni et al. | |
| 4,774,155 A | 9/1988 | Nientiedt et al. | |
| 4,833,172 A | 5/1989 | Schwarz et al. | |
| 4,873,037 A | 10/1989 | Chau et al. | |
| 4,948,544 A | 8/1990 | Van Unen et al. | |
| 4,957,943 A | 9/1990 | McAllister et al. | |
| 4,994,335 A | 2/1991 | Kamaei et al. | |
| 5,051,183 A | 9/1991 | Takita et al. | |
| 5,217,649 A | 6/1993 | Kulkarni et al. | |
| 5,240,655 A | 8/1993 | Troffkin et al. | |
| 5,281,491 A | 1/1994 | Rein et al. | |
| 5,328,760 A | 7/1994 | Gillberg-LaForce | |
| 5,336,573 A | 8/1994 | Zuckerbrod et al. | |
| 5,478,677 A | 12/1995 | Choi et al. | |
| 5,503,791 A | 4/1996 | Fortuin et al. | |
| 5,641,562 A | 6/1997 | Larson et al. | |
| 5,641,565 A | 6/1997 | Sogo | |
| 5,830,554 A | 11/1998 | Kaimai et al. | |
| 5,865,926 A | 2/1999 | Wu et al. | |
| 5,922,417 A | 7/1999 | Singleton et al. | |
| 5,939,181 A | 8/1999 | Kumano et al. | |
| 5,942,587 A | 8/1999 | Arjunan et al. | |
| 5,948,557 A | 9/1999 | Ondeck et al. | |
| 5,955,187 A * | 9/1999 | McCormack | A61F 13/51403 |
| | | | 428/315.5 |
| 5,962,161 A | 10/1999 | Zucker | |
| 6,001,165 A | 12/1999 | Shibuya et al. | |
| 6,010,776 A | 1/2000 | Exsted et al. | |
| 6,011,194 A | 1/2000 | Buglino et al. | |
| 6,013,151 A | 1/2000 | Wu et al. | |
| 6,025,092 A | 2/2000 | Doyle et al. | |
| 6,159,634 A | 12/2000 | Yen et al. | |
| 6,242,127 B1 | 6/2001 | Paik et al. | |
| 6,396,682 B1 | 5/2002 | Kim et al. | |
| 6,461,724 B1 | 10/2002 | Radovanovic et al. | |
| 6,495,292 B1 | 12/2002 | Yen | |
| 6,558,591 B2 | 5/2003 | Calis | |
| 6,558,840 B1 | 5/2003 | Hikmet | |
| 6,559,195 B1 | 5/2003 | Yamamoto et al. | |
| 6,696,524 B2 | 2/2004 | Hausmann | |
| 6,726,732 B2 | 4/2004 | Kim et al. | |
| 6,730,440 B1 | 5/2004 | Bauer et al. | |
| 7,288,316 B2 | 10/2007 | Jester | |
| 7,452,624 B2 | 11/2008 | Hatoh et al. | |
| 7,479,243 B2 | 1/2009 | Funaoka et al. | |
| 7,754,387 B2 | 7/2010 | Harada et al. | |
| 7,815,825 B2 | 10/2010 | Funaoka et al. | |
| 7,867,649 B2 | 1/2011 | Yamaguchi et al. | |
| 7,892,672 B2 | 2/2011 | Nishikawa | |
| 8,048,520 B2 | 11/2011 | Hayes et al. | |
| 8,079,480 B2 | 12/2011 | Haering et al. | |
| 8,092,877 B2 | 1/2012 | Jester et al. | |
| 8,129,450 B2 | 3/2012 | Wood et al. | |
| 8,133,840 B2 | 3/2012 | Mika et al. | |
| 8,216,740 B2 | 7/2012 | Prevoir et al. | |
| 8,262,973 B2 | 9/2012 | Lee et al. | |
| 8,388,878 B2 | 3/2013 | Parrinello et al. | |
| 8,551,641 B2 | 10/2013 | Ahn et al. | |
| 8,579,621 B2 | 11/2013 | Sano et al. | |
| 8,690,981 B2 | 4/2014 | Mao | |
| 8,703,283 B2 | 4/2014 | Goerlitz et al. | |
| 8,722,231 B2 | 5/2014 | Brilmyer et al. | |
| 8,728,617 B2 | 5/2014 | Benenati et al. | |
| 8,728,659 B2 | 5/2014 | Armacanqui et al. | |
| 8,748,028 B2 | 6/2014 | Takita et al. | |
| 8,778,525 B2 | 7/2014 | Kikuchi et al. | |
| 8,859,129 B2 | 10/2014 | Brilmyer et al. | |
| 8,993,646 B2 | 3/2015 | Huang | |
| 9,159,978 B2 | 10/2015 | Yen | |
| 2001/0009716 A1 | 7/2001 | Taguchi et al. | |
| 2001/0024716 A1 | 9/2001 | Chen et al. | |
| 2003/0124324 A1 | 7/2003 | Langley et al. | |
| 2004/0080068 A1 | 4/2004 | Ooizumi et al. | |
| 2004/0265565 A1 * | 12/2004 | Fischer | B32B 37/153 |
| | | | 428/317.9 |
| 2005/0101206 A1 | 5/2005 | McCormack et al. | |
| 2006/0051530 A1 | 3/2006 | Schwarz et al. | |
| 2006/0051648 A1 | 3/2006 | Fujibayashi et al. | |
| 2007/0178324 A1 | 8/2007 | Masuda et al. | |
| 2007/0221567 A1 | 9/2007 | Simmons et al. | |
| 2008/0113259 A1 | 5/2008 | Brilmyer et al. | |
| 2008/0269366 A1 | 10/2008 | Shaffer et al. | |
| 2009/0081543 A1 | 3/2009 | Takita et al. | |
| 2009/0098450 A1 | 4/2009 | Kikuchi et al. | |
| 2009/0142657 A1 | 6/2009 | Yen | |
| 2009/0155430 A1 | 6/2009 | Lee et al. | |
| 2009/0181295 A1 | 7/2009 | Usami et al. | |
| 2009/0233145 A1 | 9/2009 | Takami et al. | |
| 2009/0270552 A1 | 10/2009 | Sugawara | |
| 2009/0280310 A1 | 11/2009 | Nitta et al. | |
| 2010/0015515 A1 | 1/2010 | Takata et al. | |
| 2010/0028758 A1 | 2/2010 | Eaves et al. | |
| 2010/0178544 A1 | 7/2010 | Nishikawa | |
| 2010/0221522 A1 | 9/2010 | Mrozinski | |
| 2011/0081601 A1 | 4/2011 | Weber et al. | |
| 2011/0143185 A1 | 6/2011 | Nishikawa | |
| 2011/0311878 A1 | 12/2011 | Inagaki | |
| 2012/0015229 A1 | 1/2012 | Ohashi et al. | |
| 2012/0288695 A1 * | 11/2012 | Jenkins | B32B 27/08 |
| | | | 428/216 |

(56) References Cited

U.S. PATENT DOCUMENTS

| | | |
|---|---|---|
| 2013/0029126 A1 | 1/2013 | Yen |
| 2013/0034769 A1 | 2/2013 | Takagi et al. |
| 2013/0052735 A1 | 2/2013 | DeRosa et al. |
| 2013/0280584 A1 | 10/2013 | Matsumura |
| 2013/0287937 A1 | 10/2013 | Joo et al. |
| 2014/0094076 A1 | 4/2014 | Mrozinski et al. |
| 2014/0147726 A1 | 5/2014 | Toyoda |
| 2014/0335421 A1 | 11/2014 | Li et al. |
| 2015/0005405 A1 | 1/2015 | Ishihara et al. |
| 2015/0118540 A1 | 4/2015 | Fujiwara et al. |
| 2015/0207121 A1 | 7/2015 | Frenzel et al. |
| 2015/0228948 A1 | 8/2015 | Maruyama et al. |
| 2017/0152359 A1 | 6/2017 | Yen |
| 2017/0214021 A1 | 7/2017 | Yen |

FOREIGN PATENT DOCUMENTS

| | | |
|---|---|---|
| CN | 101291788 A | 10/2008 |
| CN | 101356216 A | 1/2009 |
| CN | 101386686 A | 3/2009 |
| CN | 101541534 A | 9/2009 |
| CN | 103213364 A | 7/2013 |
| CN | 105655518 A | 6/2016 |
| EP | 1911352 A1 | 4/2008 |
| EP | 2036699 A1 | 3/2009 |
| EP | 2091347 B1 | 9/2010 |
| EP | 1757653 B1 | 1/2011 |
| EP | 2018407 B1 | 10/2012 |
| EP | 2796187 A1 | 10/2014 |
| EP | 2881163 A1 | 6/2015 |
| GB | 790098 A | 2/1958 |
| GB | 838468 A | 6/1960 |
| JP | 2000260413 A | 9/2000 |
| JP | 4371670 B2 | 11/2009 |
| JP | 4746797 B2 | 8/2011 |
| JP | 4746830 B2 | 8/2011 |
| KR | 20080056229 A | 6/2008 |
| WO | 9420995 A2 | 9/1994 |
| WO | 9902585 A1 | 1/1999 |
| WO | 2007117042 A1 | 10/2007 |
| WO | 2008136970 A1 | 11/2008 |
| WO | 2009044227 A1 | 4/2009 |
| WO | 2009051278 A2 | 4/2009 |
| WO | 2009123812 A1 | 10/2009 |
| WO | 2013065738 A2 | 5/2013 |
| WO | 2016028989 A1 | 2/2016 |
| WO | 2016073558 A1 | 5/2016 |
| WO | 2016073580 A1 | 5/2016 |

OTHER PUBLICATIONS

Baldwin, "A Review of State-of-the-Art Separator Materials for Advanced Lithium-Based Batteries for Future Aerospace Missions," NASA/TM-2009-215590, http://ntrs.nasa.gov/archive/nasa/casi.ntrs.nasa.gov/20090017842.pdf (2009).

"Battery Innovation: High Power/High Energy," Celgard, http://www.celgard.com/battery-innovation (accessed Sep. 2015).

"Li-ion Battery Materials: Separators," Targray Technology International Inc., http://www.targray.com/li-ion-battery/separators/pe-pp-separators (accessed Sep. 2015).

Arora et al., "Battery Separators," Chemical Reviews, 104(10):4419-62 (2004).

Abstract for Jeon et al., "Phase Behavior of Polymer/diluent/diluent mixtures and their application to control microporous membrane structure," Journal of Membrane Science, 300(1-2):172-81 (2007).

First page of Oh et al., "Microporous polyolefin film for battery separator," SPE/Antec 2001 Conference Proceedings, Dallas, Texas, vol. 1, p. 354-358.

Ulbricht, "Advanced functional polymer membranes," Polymer, 47:2217-62 (2006).

Rohatgi et al., "Separator Membrane from Crosslinked Poly(Vinyl Alcohol) and Poly(Methyl Vinyl Ether-alt-Maleic Anhydride)," Nanomaterials, 5:398-414 (Mar. 2015).

Mendelsohn et al., "Fabrication of Microporous Thin Films from Polyelectrolyte Multilayers," Langmuir, 16:5017-23 (2000).

Wu et al., "Novel Microporous Films and Their Composites," Journal of Engineered Fibers and Fabrics, 2(1):49-59 (2007).

Polymer Properties Database: Solubility Parameter; http://polymerdatabase.com/polymer%20physics/delta%20Table.html (2015).

Poly(vinylidene fluoride); https://polymerdatabase.com/polymers/polyvinylidenefluoride.html (2015).

\* cited by examiner

MICROPOROUS SHEET PRODUCT AND METHODS FOR MAKING AND USING THE SAME

CROSS-REFERENCE TO RELATED APPLICATIONS

The present application claims the benefit under 35 U.S.C. 119(e) of U.S. Provisional Patent Application No. 62/040,257, filed Aug. 21, 2014, and U.S. Provisional Patent Application No. 62/112,904, filed Feb. 6, 2015, the disclosures of which are incorporated herein by reference.

BACKGROUND OF THE INVENTION

The present invention relates generally to microporous sheet products and relates more particularly to a novel microporous sheet product and to methods of making and using the same.

Microporous sheet products are well-known and commonly used articles found in items as diverse as, for example, storage batteries, food packaging materials, and ultrafiltration devices. For example, in storage batteries, microporous sheet products are commonly used as battery separators. Typically, a storage battery includes at least one pair of electrodes of opposite polarity and, in many cases, includes a series of electrode pairs of alternating polarity. The current flow between the electrodes of each pair is maintained by an electrolyte. Depending on the nature of the battery system, the electrolyte may be acidic, alkaline, or substantially neutral. For example, in alkaline storage batteries, which include, but are not limited to, primary, secondary, nickel, zinc and silver cells, the electrolyte is generally an aqueous solution of potassium hydroxide. By contrast, in lead acid batteries, the electrolyte is typically a sulfuric acid solution, and, in lithium rechargeables, the electrolyte is typically a lithium salt solution in an aprotic organic solvent or solvent blend.

A battery separator is typically provided in a storage battery between adjacent electrodes of opposite polarity to prevent direct contact between the oppositely charged electrode plates since such direct contact would result in a short circuit of the battery. In general, it is highly desirable for the separator to possess one or more of the following qualities: (i) to be thin and lightweight to aid in providing a battery of high energy density and specific energy; (ii) to have a structure that inhibits dendrite formation between the electrode plates; (iii) to have the ability to enhance the uptake of the electrolytic composition over the electrode plates and, in so doing, to promote a substantially uniform distribution of the electrolytic composition over the electrode plates (an effect generally referred to as wicking); (iv) to provide the property of freely permitting electrolytic conduction; and (v) to have a dimensionally stable structure even during thermal excursions (internal or external heating). It is further highly desirable for the separator to be made in an economical and environmentally safe manner while being substantially free of defects, such as pinholes and the like.

One known type of separator comprises a nonwoven fibrous material, the nonwoven fibrous material typically having a high porosity, an average pore size of at least 10 microns, and low resistivity. An example of such a separator is disclosed in U.S. Pat. No. 4,279,979, inventors Benson et al., which issued Jul. 21, 1981, and which is incorporated herein by reference. In particular, in the aforementioned patent, there is disclosed a nonwoven fibrous substrate for a battery separator. The aforementioned substrate, which is said to be for an alkaline battery separator, is made of a lightweight, porous, heat bonded, synthetic organic sheet material having a basis weight of less than about 35 gsm and a thickness of less than about 200 microns. The major fibrous component is synthetic pulp comprising thermoplastic polyolefin fibers having a prefused microfibrillar structure similar to wood pulp. The minor fibrous component is a high tenacity polyamide fiber having a fiber length greater than about 6 mm. The heat bonding by partial fusion of the microfibrillar polyolefin is sufficient to impart to the sheet material a wet tensile strength of at least 400 g/in width while permitting retention of air permeability of about 100 liters per minute and more. The substrate is said to be particularly well-suited for use in nickel-zinc batteries.

Another known type of separator is disclosed in U.S. Pat. No. 4,283,442, inventors Machi et al., which issued Aug. 11, 1981, and which is incorporated herein by reference. In particular, in the aforementioned patent, there is disclosed a method of producing a dimensionally stable battery separator. The method is characterized by grafting acrylic acid and/or methacrylic acid onto a polyethylene film, treating the resulting membrane with an aqueous alkaline solution, and drying the treated membrane under application of tension.

Still another known type of separator comprises a microporous sheet product that is formed by extruding a composition that includes a polyolefin and a liquid plasticizer and, thereafter, removing the plasticizer to produce a sheet with a microporous structure. An example of such a separator is disclosed in U.S. Patent Application Publication No. US 2013/0029126 A1, inventor Yen, which was published Jan. 31, 2013, and which is incorporated herein by reference. In particular, in the aforementioned publication, there is disclosed a sheet product suitable for use as a battery separator, as well as a method of forming the sheet product. The method comprises forming a mixture of a polyolefin and a fluid having a high vapor pressure, shaping the mixture into a sheet material and subjecting the sheet material to stretching/fluid vaporization at high temperature to form an intermediate material having a ratio of percent fluid to percent polymer crystallinity of between 0.15 and 1, followed by a second stretching/fluid vaporization at a lower temperature while removing a portion of the remainder of the fluid from the sheet. The resultant sheet is annealed and the remainder of fluid is removed to form a sheet product having a thickness comprising a stratified structure of small and larger pore layered configuration across its thickness.

Still yet another known type of separator is disclosed in U.S. Pat. No. 8,722,231 B2, inventors Brilmyer et al., which issued May 13, 2014, and which is incorporated herein by reference. In the aforementioned patent, there is disclosed a separator for a lead-acid energy storage cell. The separator includes a microporous matrix of pore forming particles or fibers, the pore forming particles or fibers being made of natural and synthetic rubbers, polyolefins (such as polyethylene), and non-woven glass fibers. The separator further includes a reversible porosity-controlling agent randomly distributed throughout the microporous matrix. The reversible porosity-controlling agent may be selected from particles that expand or contract in response to an electrolyte concentration or materials that expand or contract in response to temperature. The separator may also include a particulate filler, which may be selected from carbon black, diatomaceous earth and silica particles.

Additional documents that may be of interest include the following, all of which are incorporated herein by reference: U.S. Pat. No. 8,859,129 B2, inventors Brilmyer et al., issued Oct. 14, 2014; U.S. Pat. No. 8,728,659 B2, inventors Armacanqui et al., issued May 20, 2014; U.S. Pat. No. 8,690,981 B2, inventor Mao, issued Apr. 8, 2014; U.S. Pat. No. 8,133,840 B2, inventors Mika et al., issued Mar. 13, 2012; U.S. Pat. No. 8,129,450 B2, inventors Wood et al., issued Mar. 6, 2012; U.S. Pat. No. 7,754,387 B2, inventors Harada et al., issued Jul. 13, 2010; U.S. Pat. No. 6,726,732 B2, inventors Kim et al., issued Apr. 27, 2004; U.S. Pat. No. 6,559,195 B1, inventors Yamamoto et al., issued May 6, 2003; U.S. Pat. No. 6,396,682 B1, inventors Kim et al., issued May 28, 2002; U.S. Pat. No. 5,922,417, inventors Singleton et al., issued Jul. 13, 1999; U.S. Pat. No. 5,478,677, inventors Choi et al., issued Dec. 26, 1995; U.S. Pat. No. 4,614,575, inventors Juda et al., issued Sep. 30, 1986; U.S. Pat. No. 4,330,602, inventors O'Rell et al., issued May 18, 1982; U.S. Pat. No. 4,288,503, inventor Goldberg, issued Sep. 8, 1981; U.S. Pat. No. 4,224,394 A, inventor Schmidt, issued Sep. 23, 1980; U.S. Pat. No. 4,100,324, inventors Anderson et al., issued Jul. 11, 1978; U.S. Patent Application Publication No. US 2015/0118540 A1, inventors Fujiwara et al., published Apr. 30, 2015; U.S. Patent Application Publication No. US 2013/0034769 A1, inventors Takagi et al., published Feb. 7, 2013; U.S. Patent Application Publication No. US 2011/0081601 A1, inventors Weber et al., published Apr. 7, 2011; U.S. Patent Application Publication No. US 2010/0028758 A1, inventors Eaves et al., published Feb. 4, 2010; U.S. Patent Application Publication No. 2009/0142657 A1, inventor Yen, published Jun. 4, 2009; PCT International Publication No. WO 94/20995 A2, published Sep. 15, 1994; Japanese Patent Document No. JP 2000260413 A, published Sep. 22, 2000; Japanese Patent Document No. JP 4746830 B2, published Aug. 10, 2011; Japanese Patent Document No. JP 4746797 B2, published Aug. 10, 2011; Japanese Patent Document No. 4371670 B2, published Nov. 25, 2009; United Kingdom Patent Application Publication No. GB 838468 A, published Jun. 22, 1960; United Kingdom Patent Application Publication No. GB 790098A, published Feb. 5, 1958; Ulbricht, "Advanced functional polymer membranes," *Polymer*, 47:2217-62 (2006); Rohatgi et al., "Separator Membrane from Cross-linked Poly(Vinyl Alcohol) and Poly(Methyl Vinyl Ether-alt-Maleic Anhydride)," *Nanomaterials*, 5:398-414 (2015); Mendelsohn et al., "Fabrication of Microporous Thin Films from Polyelectrolyte Multilayers," *Langmuir,* 16:5017-23 (2000); and Wu et al., "Novel Microporous Films and Their Composites," *Journal of Engineered Fibers and Fabrics,* 2(1):49-59 (2007).

SUMMARY OF THE INVENTION

It is an object of the present invention to provide a novel microporous sheet product.

According to one aspect of the invention, there is provided a microporous sheet product, the microporous sheet product being made by a method comprising melt-extruding an extrusion mixture to produce a sheet material, the extrusion mixture comprising a thermoplastic polymer, a superabsorbent polymer, and a compatibilizing agent, the compatibilizing agent promoting mixing of the thermoplastic polymer and the superabsorbent polymer and forming micropores in the sheet material.

In a more detailed feature of the invention, the thermoplastic polymer may comprise one or more thermoplastic polymers selected from the group consisting of polyolefins, polyamides, polyethylene terephthalate, polyacrylics, and polyvinyl acetate.

In a more detailed feature of the invention, the thermoplastic polymer may comprise one or more thermoplastic polymers selected from the group consisting of polyolefins and polyamides.

In a more detailed feature of the invention, the thermoplastic polymer may be a polyolefin.

In a more detailed feature of the invention, the thermoplastic polymer may be a polyethylene.

In a more detailed feature of the invention, the thermoplastic polymer may be a polyamide.

In a more detailed feature of the invention, the thermoplastic polymer may constitute about 15-80% by volume of the extrusion mixture.

In a more detailed feature of the invention, the superabsorbent polymer may comprise one or more superabsorbent polymers selected from the group consisting of cross-linked polyacrylates, methacrylates, polyacrylamides, carboxymethyl celluloses, polyvinyl alcohol copolymers, polyethylene oxides, starch-grafted copolyacrylates or polyacrylamides, and ethylene maleic anhydride copolymers.

In a more detailed feature of the invention, the superabsorbent polymer may comprise a cross-linked polyacrylate.

In a more detailed feature of the invention, the cross-linked polyacrylate may be a cross-linked lithium polyacrylate.

In a more detailed feature of the invention, the superabsorbent polymer may be in particle form and may have a particle size smaller than about 30 microns.

In a more detailed feature of the invention, the superabsorbent polymer may have a particle size of between 1 to 10 microns.

In a more detailed feature of the invention, the superabsorbent polymer may constitute about 1-80% by volume of the extrusion mixture.

In a more detailed feature of the invention, the superabsorbent polymer may constitute about 22-40% by volume of the extrusion mixture.

In a more detailed feature of the invention, the compatibilizing agent may be selected from the group consisting of plasticizers and surfactants.

In a more detailed feature of the invention, the plasticizer may be selected from the group consisting of polyethylene oxide, polyethylene glycol, hydroxypropylene, phthalates, mineral oil, and mineral spirits.

In a more detailed feature of the invention, the plasticizer may be mineral spirits.

In a more detailed feature of the invention, the compatibilizing agent may constitute about 1-80% by volume of the extrusion mixture.

In a more detailed feature of the invention, the compatibilizing agent may constitute about 5-70% by volume of the extrusion mixture.

In a more detailed feature of the invention, the compatibilizing agent may constitute about 10-50% by volume of the extrusion mixture.

In a more detailed feature of the invention, the thermoplastic polymer may constitute about 15-80% by volume of the extrusion mixture, the superabsorbent polymer may constitute about 1-80% by volume of the extrusion mixture, and the compatibilizing agent may constitute about 1-80% by volume of the extrusion mixture.

In a more detailed feature of the invention, the extrusion mixture may further comprise an inorganic oxide.

In a more detailed feature of the invention, the inorganic oxide may constitute about 0-20% by volume of the extrusion mixture.

In a more detailed feature of the invention, the superabsorbent polymer may have a solubility parameter above 11, and at least one of the thermoplastic material and the compatibilizing agent may have a solubility parameter above 11.

In a more detailed feature of the invention, the thermoplastic polymer may have a solubility parameter above 11.

In a more detailed feature of the invention, the compatibilizing agent may have a solubility parameter above 11.

In a more detailed feature of the invention, the method may further comprise removing the compatibilizing agent from the sheet material.

In a more detailed feature of the invention, the step of removing the compatibilizing agent may comprise vaporizing the compatibilizing agent.

In a more detailed feature of the invention, the microporous sheet product may have a resistivity below 1,000 ohm-cm as tested in a 30% KOH solution.

In a more detailed feature of the invention, the microporous sheet product may have a resistivity below about 500 ohm-cm as tested in a 30% KOH solution.

In a more detailed feature of the invention, the microporous sheet product may have a resistivity below 100 ohm-cm as tested in a 30% KOH solution.

In a more detailed feature of the invention, the microporous sheet product may experience a weight loss of at least 20% of the superabsorbent polymer when soaked in 30% KOH solution for 2 days.

In a more detailed feature of the invention, the microporous sheet product may have an average pore size below 5 microns.

According to another aspect of the invention, there is provided a microporous sheet product made by a method comprising melt-extruding an extrusion mixture, the extrusion mixture comprising a thermoplastic polymer and a superabsorbent polymer, wherein the thermoplastic polymer is a polyamide.

In a more detailed feature of the invention, the superabsorbent polymer may be in particle form and may have a particle size smaller than about 30 microns.

In a more detailed feature of the invention, the superabsorbent polymer may have a particle size of between 1 to 10 microns.

In a more detailed feature of the invention, the polyamide may constitute about 60-78% of the extrusion mixture, and the superabsorbent polymer may constitute the remainder of the extrusion mixture.

In a more detailed feature of the invention, the extrusion mixture may further comprise a compatibilizing agent to promote mixing of the thermoplastic polymer and the superabsorbent polymer.

In a more detailed feature of the invention, the compatibilizing agent may constitute about 10-50% by volume of the extrusion mixture.

In a more detailed feature of the invention, the method may further comprise cooling the melt-extrudate and then subjecting the cooled melt-extrudate to a stretching/liquid vaporization step.

In a more detailed feature of the invention, the microporous sheet product may have a resistivity below 1,000 ohm-cm as tested in a 30% KOH solution.

In a more detailed feature of the invention, the microporous sheet product may have a resistivity below about 500 ohm-cm as tested in a 30% KOH solution.

In a more detailed feature of the invention, the microporous sheet product may have a resistivity below 100 ohm-cm as tested in a 30% KOH solution.

In a more detailed feature of the invention, the microporous sheet product may experience a weight loss of at least 20% of the superabsorbent polymer when soaked in 30% KOH solution for 2 days.

According to yet another aspect of the invention, there is provided a multilayer sheet product, the multilayer sheet product comprising a plurality of stacked layers, wherein at least one of the stacked layers is any of the microporous sheet products described above.

According to still another aspect of the invention, there is provided a multilayer sheet product, the multilayer sheet product comprising a first layer and a second layer, the first layer and the second layer being in direct contact with one another, the first layer comprising any of the microporous sheet products described above, the second layer being devoid of a superabsorbent polymer.

It is another object of the present invention to provide a novel method for preparing a microporous sheet product.

According to one aspect of the invention, there is provided a method of making a microporous sheet product, the method comprising the steps of (a) melt-extruding an extrusion mixture to produce a sheet material, the extrusion mixture comprising a thermoplastic polymer, a superabsorbent polymer, and a compatibilizing agent, the compatibilizing agent promoting mixing of the thermoplastic polymer and the superabsorbent polymer and forming micropores in the sheet material, (b) then, cooling the sheet material, and (c) then, subjecting the sheet material to a stretching/vaporizing step, whereby the compatibilizing agent is removed from the sheet material, thereby producing a microporous sheet product comprising an open-celled matrix of thermoplastic polymer in which the superabsorbent polymer is dispersed.

In a more detailed feature of the invention, the superabsorbent polymer may be a cross-linked lithium polyacrylate.

In a more detailed feature of the invention, the superabsorbent polymer may have a solubility parameter above 11, and at least one of the thermoplastic polymer and the compatibilizing agent may have a solubility parameter above 11.

It is another object of the present invention to provide a novel food packaging material and a method of preparing the same.

According to one aspect of the invention, there is provided a method of preparing a food packaging material, the method comprising the steps of (a) providing a microporous sheet product, the microporous sheet product made by a method comprising melt-extruding an extrusion mixture to produce a sheet material, the extrusion mixture comprising a thermoplastic polymer, a superabsorbent polymer, and a compatibilizing agent, the compatibilizing agent promoting mixing of the thermoplastic polymer and the superabsorbent polymer and forming micropores in the sheet material; and (b) then, imbibing the microporous sheet product with a liquid smoke extract flavoring.

According to another aspect of the invention, there is provided a food packaging material made by the above-described method.

The present invention is also directed at a method of separating the electrodes of a battery, the method comprising positioning, between the electrodes, a microporous sheet product made by a method comprising (a) melt-extruding an extrusion mixture to produce a sheet material, the extrusion mixture comprising a thermoplastic polymer, a superabsorbent polymer, and a compatibilizing agent, the compatibilizing agent promoting mixing of the thermoplastic polymer and the superabsorbent polymer and forming micropores in the sheet material and (b) then, removing the compatibilizing agent from the sheet material.

The present invention is further directed at a method of packaging a food item, the method comprising contacting the food item with a microporous sheet product made by a method comprising melt-extruding an extrusion mixture to produce a sheet material, the extrusion mixture comprising a thermoplastic polymer, a superabsorbent polymer, and a compatibilizing agent, the compatibilizing agent promoting mixing of the thermoplastic polymer and the superabsorbent polymer and forming micropores in the sheet material.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

Figure 1:
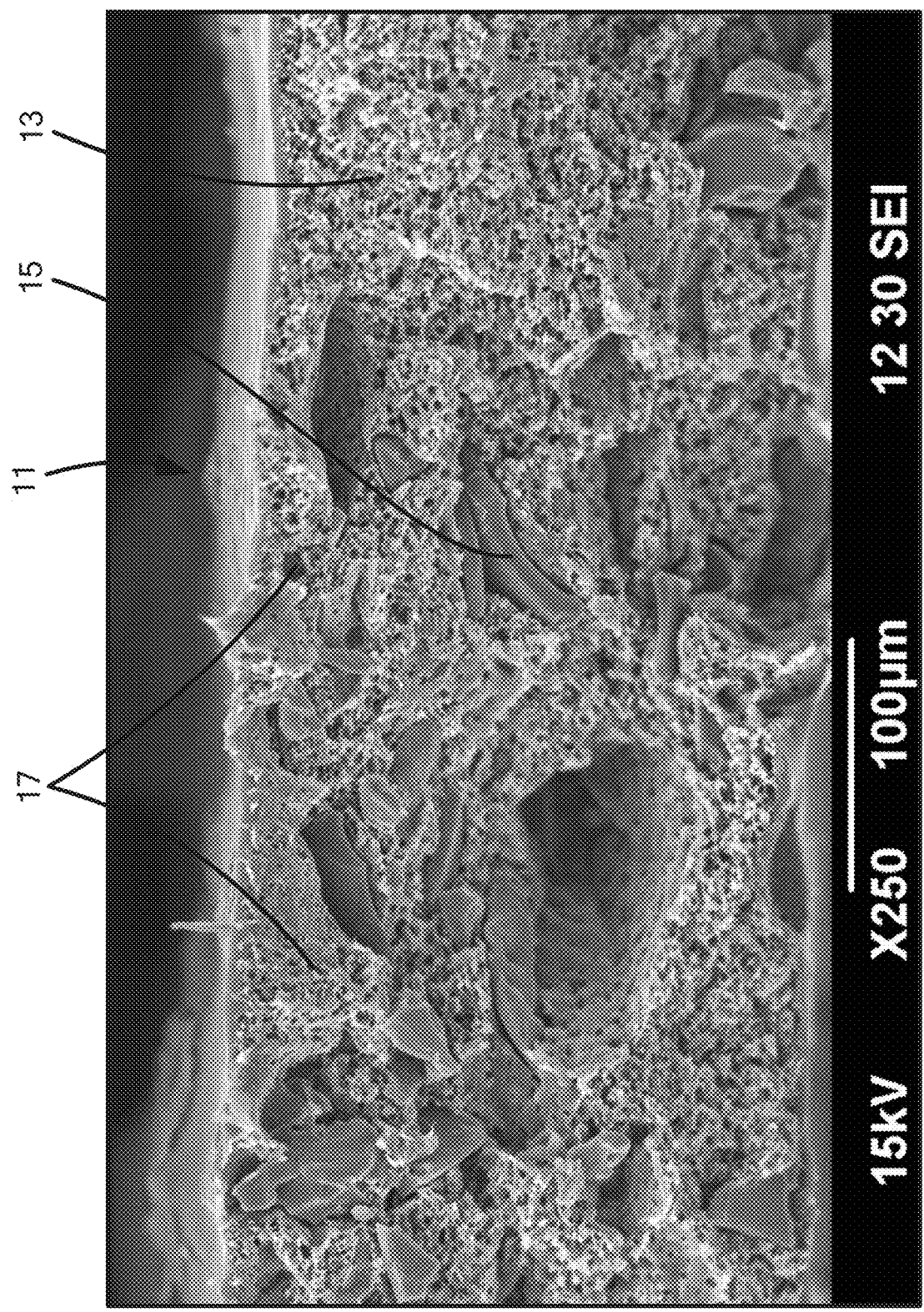
FIG. 1 is a scanning electron microscope (SEM) image, taken as a side view, of a microporous sheet product suitable for use as, for example, a battery separator, the microporous sheet product being prepared according to the present invention.

The present invention is directed at a novel microporous sheet product, as well as to methods of making and using the same. The present invention is based, in part, on the surprising discovery that a microporous sheet product having desirable properties can be prepared by melt-extruding an extrusion mixture to produce a sheet material, the extrusion mixture comprising a thermoplastic polymer, a superabsorbent polymer, and a compatibilizing agent. The compatibilizing agent promotes mixing between the thermoplastic polymer and the superabsorbent polymer and, in addition, creates (i.e., by phase-separation) micropores in the sheet material, the compatibilizing agent substantially filling the micropores of the sheet material to produce a "wet" porous structure. In certain instances, for example, where the microporous sheet material is used as a food packaging material, the thus-produced microporous sheet material may be used without any further processing. In other instances, for example, where the microporous sheet material is used as a battery separator, the microporous sheet material may thereafter be processed to extract the compatibilizing agent from the sheet material, thereby producing a "dry" porous structure. In any event, whether the porous structure is "wet" or "dry," the resultant porous structure comprises an open-celled matrix of thermoplastic polymer in which superabsorbent polymer particles are dispersed. When the microporous sheet product of the present invention is thereafter exposed to a polar or ion-containing solvent, the superabsorbent polymer particles absorb the solvent and swell. Such swelling causes a reduction in the pore size of the microporous sheet product, as well as an increase in the electrolytic-conductivity of the microporous sheet product. Surprisingly, the absorption of solvent by the superabsorbent polymer particles also causes some of the superabsorbent polymer particles to migrate irreversibly from within the matrix to the exterior of the matrix whereas other superabsorbent polymer particles remain within the matrix. Those superabsorbent particles that migrate from within the matrix to the exterior of the matrix tend to increase the hydrophilicity of the exterior surfaces of the sheet product.

For purposes of clarity, some of the terms used herein and in the appended claims to describe the subject invention are explained further below:

The term "sheet material" is intended to refer to a unitary article having two large surfaces with respect to its length and breadth dimensions and having a thickness between said surfaces. In general, the term is used to describe structures achieved during the initial extrusion or shaping of material into a sheet-like form and of structures produced during subsequent processing of the sheet material.

The term "sheet product" is intended to encompass a single-layer or multi-layer structure consisting of a single sheet material or comprising a plurality of stacked or laminated sheet materials.

The terms "fluid," "liquid," or "solvent," used interchangeably, refer to liquid components used in the extrusion mixture used to form sheet material. These terms may also be used in reference to a liquid used in a cooling bath for initial cooling of a formed sheet material, fluid used in other processing steps, and for the fluid removed during a stretching/fluid vaporization step.

The term "separator" is intended to refer to a component of a battery, in particular a storage battery, by which the component maintains a separation between adjacent electrode plates or elements of opposite polarity. The separator may be of various configurations, such as flat (preferred), ribbed, corrugated sheet which may be in the form of a membrane or envelope capable of maintaining separation of adjacent electrodes.

The term "dendrite" is intended to refer to growths that develop on and extend outward from the surface of an electrode element and are due to the re-plating of electrode material during cycling of the battery. Dendrite formations that traverse through a separator from one electrode to another electrode of opposite polarity may cause shorting of the battery cell.

The term "fluidity" is intended to refer to polymeric compositions that exhibit flow properties that are caused by the physical ability of the polymer molecules of the composition to slide over one another. This ability is enhanced by the inclusion of a fluid material, especially when the polymer has minor (low) solubility properties with respect to the fluid component in contact therewith.

The terms "superabsorbent polymer," "SAP," and "superabsorber" refer to a polymeric compound which can absorb and retain large amounts of liquid relative to its own mass. The superabsorbent polymer creates interstices from the absorbing liquid.

The term "solubility parameter" refers to a numerical estimate of the degree of interaction between materials and is a good indication of material compatibility, particularly for nonpolar materials, such as many polymers. The solubility parameter for polyolefin is typically about 8, for paraffin oil is about 8, for nitrile rubber is about 9, for polyester is about 11, for polyamide is about 14, for water is 23.4, and for ethylene glycol is about 30.

$$\delta = \sqrt{\frac{\Delta H_v - RT}{V_m}}$$

$\delta$=solubility parameter, [cal 1/2 cm-3/2]
$H_v$=heat of vaporization
R=gas constant
T=temperature
$V_m$=molar volume of molecules in the condensed phase As noted above, the microporous sheet product of the present invention may be formed, at least in part, by melt-extruding an extrusion mixture, the extrusion mixture comprising a thermoplastic polymer, a superabsorbent polymer, and a compatibilizing agent, the compatibilizing agent promoting mixing between the thermoplastic polymer and the superabsorbent polymer and also creating micropores in the resultant sheet material.

The thermoplastic polymer of the above-described extrusion mixture may be used primarily as a binder to provide a supporting scaffold or matrix in which superabsorbent polymer particles may be dispersed and to protect the superabsorbent polymer from thermal degradation during melt-extrusion. As such, the thermoplastic polymer may comprise one or more thermoplastic polymers of the type that can be used to form a microporous sheet by melt-extrusion. The one or more thermoplastic polymers may include one or more thermoplastic homopolymers, copolymers or terpolymers. The thermoplastic polymer of the present invention preferably has a weight average molecular weight of from about 20,000 to about 1,000,000. Examples of suitable classes of thermoplastic polymers may include, but are not limited to, polyolefins, polyamides, polyethylene terephthalate, polyacrylics, polyvinyl acetate, and the like. Preferred classes of thermoplastic polymers include polyamides and polyolefins. Examples of polyolefins include, but are not limited to, linear low density or high density polyethylene, polypropylene, and polybutylene.

Melt flow index or MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method for determining MFI is described in ASTM D1238 and ISO 1133. Melt flow rate is an indirect measure of the molecular weight of a polymer. Preferred polyolefins for use as the thermoplastic polymer of the present invention have a Melt Flow Index (MFI) below about 4.

Preferred polyamides for use as the thermoplastic polymer of the present invention typically have formic acid Relative Viscosity (RV) of 4 and above in accordance with ISO 307.

Preferred polyolefins for use as the thermoplastic polymer of the present invention have a crystallinity of at least 30 percent.

As noted above, the thermoplastic polymer component of the present invention may comprise multiple polymers. For example, a polyethylene may be blended with a second polymer, such as a polypropylene, a polyamide, a fluoropolymer, or the like, in varying percentages. Alternatively, a blend of different molecular weight grades of the same polymer (e.g., a polyethylene) may be used.

The thermoplastic polymer preferably constitutes about 15-80% by volume of the extrusion mixture.

The superabsorbent polymer of the above-described extrusion mixture may be used primarily to absorb liquid that may be added to the microporous sheet product. For example, in those instances in which the microporous sheet product is used as a battery separator, the superabsorbent polymer may be used to absorb liquid electrolyte. In so doing, the superabsorbent polymer may reduce the pore size of the thermoplastic polymer matrix, as well as improving the wettability of the battery separator, allowing electrolytic conduction, and reducing the resistance of the battery separator.

The superabsorbent polymer of the present invention may comprise one or more types of superabsorbent polymers. Examples of suitable superabsorbent polymers include, but are not limited to, various cross-linked polymers, such as cross-linked polyacrylates (e.g., sodium, hydrogen, potassium, lithium, or zinc), methacrylates, polyacrylamides, carboxymethyl celluloses, polyvinyl alcohol copolymers, polyethylene oxides, starch-grafted copolyacrylates or polyacrylamides, ethylene maleic anhydride copolymers, and copolymers thereof. The superabsorbent polymer may further include a functional cation, such as a lithium ion, a sodium ion, a potassium ion, an alkaline earth metal ion, or a zinc ion. The superabsorbent polymer is preferably in particle form and preferably has a particle size smaller than about 100 microns, more preferably smaller than about 30 microns, and most preferably between 1 to 10 microns. In this manner, by keeping the particle size of the superabsorbent polymer small, it is easier to evenly distribute the superabsorbent polymer throughout the extruded sheet material, thereby reducing the frequency of pinholes being formed in the resultant sheet product. Organic acid superabsorbers, such as, but not limited to, polyacrylic acid, polymethacrylic acid, and ethylene maleic anhydride polymer, tend to best absorb liquid near neutral pH. The extent of cross-linking in the superabsorbent polymer should be kept within specific limits so that the superabsorbent may absorb liquids, such as a liquid electrolyte, without forming an amorphous gel.

The superabsorbent polymer preferably constitutes about 1-80% by volume of the extrusion mixture.

The compatibilizing agent of the aforementioned extrusion mixture may be used to promote a uniform mixing of the thermoplastic polymer and the superabsorbent polymer and to help the mixture to flow at elevated temperatures (e.g., about 100-250° C.). In addition, the compatibilizing agent may also be used to create (i.e., by phase-separation) micropores in the extruded sheet material. Where the superabsorbent polymer has a solubility parameter above 11, it may be desirable for at least one of the thermoplastic polymer and the compatibilizing agent to have a solubility parameter above 11.

The compatibilizing agent of the present invention may be, for example, any plasticizer or surfactant that promotes the uniform mixing of the thermoplastic polymer and the superabsorbent polymer at elevated temperatures. In most cases, the compatibilizing agent is a liquid. Examples of plasticizers that may be used as a compatibilizing agent according to the present invention include, but are not limited to, low molecular weight organic liquids, such as mineral spirits, mineral oil, lower molecular weight alkanes, $C_9$-$C_{20}$ aliphatic, alicyclic or aromatic hydrocarbons, polyethylene oxide, glycols (e.g., polyethylene glycol), hydroxypropylene, phthalates, oils, food additives, and the like, as well as mixtures thereof.

The compatibilizing agent phase-separates from the thermoplastic and superabsorbent polymers and, in so doing, creates micropores in the thus-formed sheet material. In those instances where, for example, the microporous sheet material is to be used as a food packaging material, no further processing of the microporous sheet material may be needed. On the other hand, in those instances where, for example, the microporous sheet material is to be used, for example, as a battery separator, the microporous sheet material may thereafter be treated so that the compatibilizing agent is removed from the microporous sheet material. Such removal of the compatibilizing agent may be effected, for example, by a conventional solvent extraction technique and/or by the stretching/vaporization technique of U.S. Patent Application Publication No. US 2013/0029126 A1. The removal of the compatibilizing agent in the aforementioned fashion creates open (available) capillaries for electrolyte conductivity in the finished sheet product.

The compatibilizing agent preferably constitutes about 1-80% by volume, more preferably 5-70% by volume, and most preferably 10-50% by volume, of the mixture.

The above-described extrusion mixture may further contain small amounts of fillers, colorants, anti-oxidants, stabilizers, and the like. For example, the mixture may contain one or more inorganic oxides, which may improve the porosity and rate of swelling of the sheet product. (Where the sheet product is used as a battery separator, such swelling creates beneficial cell stack pressure.) Suitable inorganic oxides may include, but are not limited to, oxides of silicon, aluminum, lithium, magnesium, calcium, titanium, zinc, zirconium, or barium. Such oxides may be in the form of fine particles, preferably about 0.1-10 microns in diameter. Such particles may have a surface area of at least 5 m$^2$/g, and preferably from about 5-200 m$^2$/g and may have a pore volume (BET) of from about 0.01-1 ml/g. The particles may be prepared by any method that results in fine particles, such as, but not limited to, milling, condensation, precipitation, fume condensation, or any other appropriate method. These compounds, when added to the extrusion mixture, increase porosity, especially after stretching of the polymer sheet material. Preferably, the oxide is crystalline, is essentially insoluble in aqueous solution, especially basic solution, and has an elevated melting temperature of over 500° C.

Where an inorganic filler is used as part of the extrusion mixture, the inorganic filler preferably constitutes about 0-20% by volume of the mixture.

As noted above, an extrusion mixture of the type described above may be melt-extruded to produce a microporous sheet material, and, depending on the use to which the microporous sheet material is intended to be put, the microporous sheet material may then undergo additional processing. Details of a suitable melt-extrusion process and of a suitable method for processing the extruded sheet material to produce a microporous sheet product suitable for use as a battery separator are provided below.

First, the extrusion mixture may be prepared and extruded. Mixing may be performed prior to or during the extrusion process. For example, the various components of the extrusion mixture may be fed into a single- or twin-screw feed chamber of an extruder. An example of a suitable extruder is disclosed in PCT International Publication No. WO 2009/051278 A2, which was published on Apr. 23, 2009, and which is incorporated herein by reference. Preferably, a co-rotating twin screw continuous extruder is used to blend the various components of the extrusion mixture and to produce an extrudate. The extruder, which preferably has two shafts, preferably has at least a L/D (length over diameter) of at least 24 and at least 5 barrels (temperature zones). The mixture may be fed into the first barrel, with the second barrel being used to blend and to melt the mixture. Optionally, liquid plasticizer may be injected into a subsequent barrel, and an open barrel may be used to evacuate any potential volatiles, such as water vapor, in the mixture. Finally, a pumping barrel may be used to pressurize the melt and to pump the melted mixture from the extruder into a die on a continuous basis. The extruder preferably comprises at least 3 L/D of right-handed conveying screw bushing, at least ⅓ L/D of left-handed screw bushing for conveying control, and at least 1 L/D of right-handed kneading blocks for the melting and mixing of materials. The melted material may then be pumped through a heated metal slotted die, which may be used to form the extrudate into a shaped film of sheet material.

The thus-formed sheet material may then be cooled. This may be accomplished, for example, by casting the sheet material onto a chilled roll or by immersing the sheet material in a cooling bath for a sufficient time to solidify the sheet material. The cooling roll or bath is preferably maintained at a temperature below 100° C. so that the sheet material is cooled below the melt temperature of the thermoplastic polymer.

In certain instances, for example, where the sheet material is to be used as a food packaging material, it may be acceptable for the compatibilizing agent to be retained in situ. In other instances, for example, where the sheet material is to be used as a battery separator, the cooled sheet material may be subjected to some form of processing to remove the compatibilizing agent from the sheet material. Such processing may involve a stretching/fluid vaporization technique that may comprise, in a first step, stretching the sheet in at least one direction. This first direction of stretching may be conducted in the machine direction from which the sheet material exits the extrusion die head and the cooling bath. The stretching can be readily accomplished, for example, by passing the sheet material through nip rollers of a set rotation surface speed and then through a second set of higher speed nip rollers prior to a take-up roller. Alternately, other conventional stretching means can be used, such as a tenter method, an inflation method or a combination thereof. The stretching in the first direction may involve stretching the sheet material at least about 125% of its initial dimension in a first direction. This first stretching is preferably done while maintaining the sheet material at an elevated temperature. For example, the stretching of polyethylene may be done at temperatures of about 20-150° C. depending on the polymer. The stretching in the first direction may be accomplished in a one-step operation or in a series of stretching operations to achieve the desired degree of elongation of the sheet material. Subsequent to stretching in a first direction, the sheet material may be stretched in a second direction, which may be transverse to the first stretching direction. The stretching in the second direction may comprise stretching from about 125-700% of its initial dimension in the second dimension. The combined stretches may have an overall ratio of about 1.5-70 fold. Depending on the formulation, machinery set-up, the stretching may be performed in sequential monoaxial steps or simultaneous biaxial stretches.

Simultaneous to the stretching, a portion or all of the compatibilizing agent may be removed from the sheet material by vaporization. The ease with which a given compatibilizing agent may be vaporized will depend on the volatility of the compatibilizing agent. Certain compatibilizing agents, such as mineral spirits, are highly volatile and can easily be vaporized by stretching at an elevated temperature.

With the stretched sheet material under tension in at least one or both stretched directions, it may be subjected to annealing. The completeness of annealing is a function of heat-transfer effectiveness, temperature, residence time and relaxation. The stretched sheet material may be maintained under these conditions for a period of at least 1 second. The sheet material may be optionally relaxed in one or both stretched directions (length and/or width of about 5-20% reduction) as known in the art to further improve dimensional stability.

In an alternative embodiment, the shaped sheet material may also be extruded in an annular die, forming the sheet in a continuous tubular form. The stretching orientation may be conducted in a conventional single, double or triple bubble blown film equipment. The tubular film may be longitudinally stretched and simultaneously inflated to orient the film under specific temperature.

A scanning electron microscope (SEM) image, taken from the side, of a microporous sheet product prepared according to the present invention is shown in FIG. 1, the microporous sheet product being represented generally by reference numeral 11. As can be seen, microporous sheet product 11 comprises a matrix of thermoplastic polymer 13 and a plurality of superabsorbent polymer particles 15, the superabsorbent polymer particles 15 being randomly distributed throughout the matrix of thermoplastic polymer 13. The micropores 17 provided in microporous sheet product 11 represent the spaces that were previously occupied by the compatibilizing agent, which has since been removed.

The thickness of a "dry" microporous sheet product (i.e., a microporous sheet product where the compatibilizing agent has been removed) according to the present invention, prior to being imbibed with any liquid, may be about 0.1-20 mil (about 0.0025-0.50 mm) although the thickness may vary based on the particular application for which the sheet product is intended.

A single-layer "dry" sheet product according to the present invention, prior to being imbibed with any liquid, preferably has no macropores (above 10 microns), preferably has at least 10% of its volume in capillary porosity as micropores (under 1 micron), preferably has at least 1% of superabsorber to create nanopores or interstices (under 0.1 micron or even below 0.01 micron), is able to swell in thickness (thereby creating hydrostatic pressure after absorbing electrolyte) and is capable of absorbing at least 5%, preferably 10%, of its weight of electrolyte or another suitable liquid. The sheet product preferably has a mean pore size below 5 microns, more preferably below 1 micron, with a narrow pore size distribution. By contrast, the superabsorbent polymer of the sheet product preferably has a particle size greater than 1 micron. Consequently, the superabsorbent polymer preferably has a particle size larger than the sheet product pore size. When the superabsorbent polymer is exposed to electrolyte or another suitable solvent, it swells and expands within the smaller pores, thereby reducing the pore size of the sheet product, improving electrolyte wettability of the pores and reducing the resistance of the sheet product.

Alternatively stated, a single-layer "dry" sheet product of the present invention, prior to being imbibed with any liquid, is a highly porous homogeneous unitary or monolithic article. The sheet product has a microporous structure preferably with an average pore size below 5 microns, more preferably below 1 micron. The thickness or weight of the dry sheet product may increase by at least 5%, more preferably 10%, after exposure to a liquid for absorption (at standard temperature and pressure). The initial dry membrane may have a certain average pore size and porosity. This porosity increases after exposing the membrane to a liquid, filling the pores with liquid and creating additional interstices from absorption. On the other hand, the overall average pore size of the membrane may be reduced after liquid exposure. The number of and average pore size may shift from micropores towards nanopores due to the chemisorption of the superabsorbent. The pore size of the dry membrane as measured by the mercury intrusion method may be in the submicron range (about 1 micron), the pore size of the imbibed membrane as measured using methods like bubble point porosimetry may be reduced and get closer to the nanopore range (below 0.1 micron or smaller). The average pore size may be reduced by 10% and more likely by 20% after absorbing liquid. Due to the chemisorption, liquid may preferentially migrate into the superabsorber, thus creating nanopores while maintaining dry or empty open micropores within the membrane structure, i.e., membrane is partially wetted in smaller pores for liquid ion diffusion and having larger pores partially dry for gas diffusion.

The porosity and pore size of the membrane surfaces allow capillary absorption of aqueous solutions, permitting chemisorption of electrolyte and liquid by the superabsorber. Since capillary action is inversely proportional to pore size, the optimal membrane configuration will have micropores allowing chemisorption of electrolyte.

The force of capillary action can be proportional to the capillary wicking height; the height h of a liquid column is given by:

$$h = \frac{2\gamma\cos\theta}{\rho g r},$$

where $\gamma$ is the liquid-air surface tension (force/unit distance), $\theta$ is the contact angle, $\rho$ is the density of liquid (mass/volume), g is local acceleration due to gravity (distance/ square of time), and r is radius of tube (distance). Thus, the thinner the space (or pore size) in which the water can travel, the greater the column height.

On exposure to electrolyte, the superabsorber swells and forms nanoporous domains within its molecules, thereby allowing ionic conduction through the microporous sheet product. The liquid-absorbed sheet product may have a greater number and volume of nanopores than the number and volume of micropores before absorption, i.e., smaller average size filled interstices after absorption of liquid. The micro-porosity and chemisorption-based nanoporosity reduce electrochemical dendrite penetration or pinhole shorting by physical interference, yet allow normal and stable operating electrolyte conductivity.

The properties of sheet products useful as battery separators include not only permeability, mechanical strength, and dimensional stability, but also properties related to electrolytic solution wicking, absorption, and battery cyclability. The present invention provides a thin, lightweight sheet product that has high electrolyte retention capability, thereby providing the battery with the ability of maintaining electrolyte over the electrode surfaces and achieving high electrolytic conductivity while, when appropriate, providing high inhibition to formation and growth of dendrites between electrode elements of opposite polarity. At the same time, the sheet product of the present invention has high mechanical strength.

The sheet product structure disclosed here tends to swell in length, width and thickness, when exposed to a suitable liquid. It is desirable to have thickness swell and limited dimensional swell to create battery electrode stack pressure. The swelling of thickness is of importance in battery systems. The advantages of this characteristic are multifold. During cycling, electrodes for rechargeable batteries are known to undergo expansion and contraction according to the incorporation of ions into the cathode structure and the stripping and replating of zinc (or lead or lithium) at the anode surface. Because separators are compressed when the electrodes expand, it is desirable that the separators have the ability to undergo such compression while exhibiting, when compressed, as little a decrease as possible in electrolytic solution retention. By having a separator which swells in electrolyte and maintains a hydrostatic pressure on the faces of the electrodes, it also maintains electrochemical activity over the entire face of the electrode by not permitting the formation of open pockets between the electrode surfaces. Since the superabsorbers used herein are somewhat gel-like, under pressure they deform to cover the whole electrode surface, maintaining intimate electrolyte and electrode contact, reducing overall cell resistance and, thus, improving electrochemical activity over that surface. SAP may swell and fill the capillary pores within the separator, and some may migrate and expand onto the separator surface(s) to promote hydrophilic surface wetting, thereby improving electrolyte absorption of the separator. An additional advantage accruing from this characteristic is that by maintaining electrochemical activity, it also guarantees a minimal current density (current per unit area of the electrode face) and, consequently, optimal efficiency of electrode activity (the total capacity retrieved per unit electrode surface area or $mAh/cm^2$). The measure of resistivity (i.e. the inverse of conductivity) is preferred to be below 1,000 ohm-cm, more preferably below about 500 ohm-cm, and most preferably below 100 ohm-cm, as tested in a 30% KOH electrolyte.

The degree of swelling of the separator exposed to electrolyte is optimized so that the separator structure will absorb electrolyte by capillary action and chemical attraction while not over-swelling or over-drying the cathode, rendering it inactive. The exact composition and structure of the membranes described in this disclosure are engineered so that electrolyte absorption and retention may be optimized.

Figure 2:
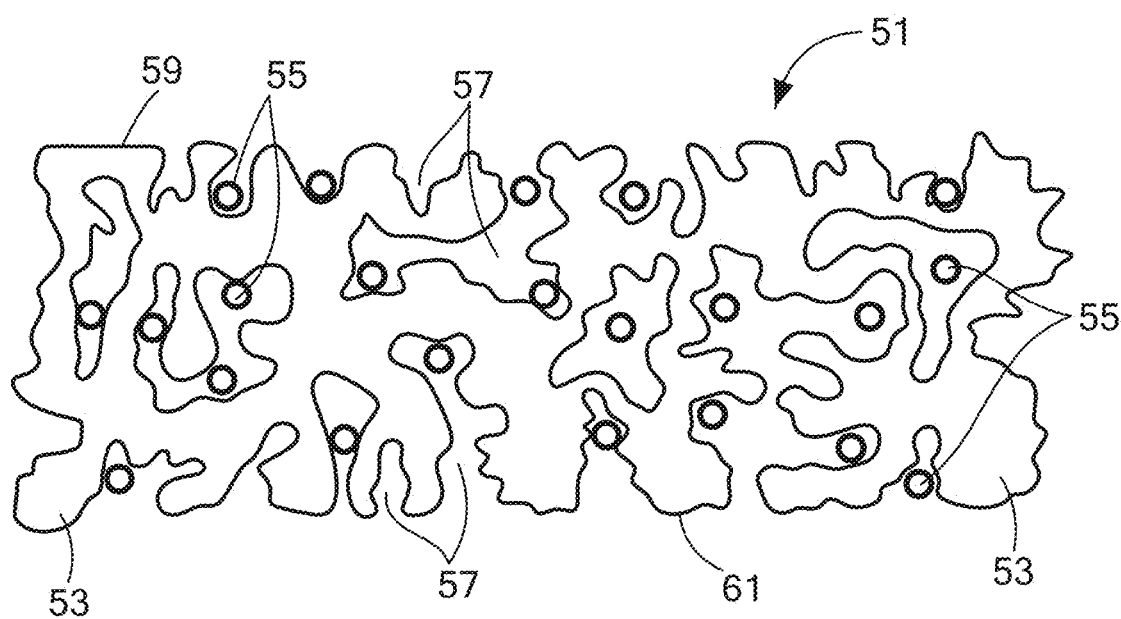
FIG. 2 is a schematic side view of a microporous sheet product suitable for use as, for example, a battery separator, the microporous sheet product being prepared according to the present invention and being shown prior to being imbibed with a polar or ion-containing liquid.

Referring now to FIG. 2, there is shown a schematic side view of a microporous sheet product prepared according to the present invention, the microporous sheet product being represented generally by reference numeral 51.

Microporous sheet product 51, which is a "dry" membrane shown prior to its exposure to a polar or ion-containing liquid, comprises a matrix of thermoplastic polymer 53 and a plurality of superabsorbent polymer particles 55, the superabsorbent polymer particles 55 being randomly distributed throughout the matrix of thermoplastic polymer 53. As can be seen, microporous sheet product 51 is a relatively open-celled structure having a plurality of micropores 57 extending from the top surface 59 and bottom surface 61 of microporous sheet product 51. The open-celled structure of microporous sheet product 51 may be attributable, at least in part to the presence of a compatibilizing agent, such as a plasticizer or surfactant, in the extrusion mixture used to prepare microporous sheet product 51. More specifically, after an extrudate is formed from an extrusion mixture containing such a compatibilizing agent, the compatibilizing agent may be vaporized or otherwise removed, with the spaces previously occupied by the compatibilizing agent leaving voids. As can be appreciated, depending on the use to which microporous sheet product 51 is to be put, compatibilizing agent may not be removed and may be retained in the voids, thereby forming a "wet" membrane.

Figure 3:
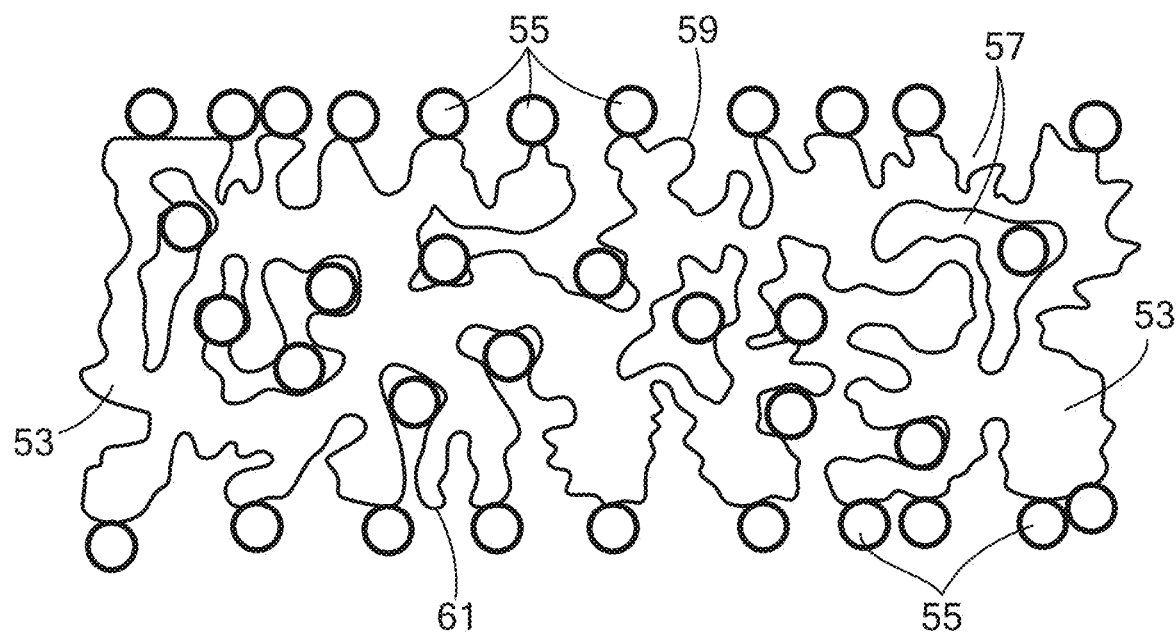
FIG. 3 is a schematic side view of the microporous sheet product of FIG. 2, the microporous sheet product being shown subsequent to being imbibed with a polar or ion-containing liquid.

When microporous sheet product 51 is exposed to a polar or ion-containing liquid, such as the liquid electrolyte of a storage battery, not only do the superabsorbent polymer particles 55 absorb the liquid and swell, thereby reducing the size of many of the pores, but some of the swollen superabsorbent polymer particles 55 irreversibly migrate from within the matrix of thermoplastic polymer 53 to the exterior surfaces of the matrix, as is illustrated in FIG. 3. This irreversible migration of superabsorbent polymer particles 55 to the exterior surfaces of the sheet product increases the hydrophilicity of the sheet product.

Figure 4:
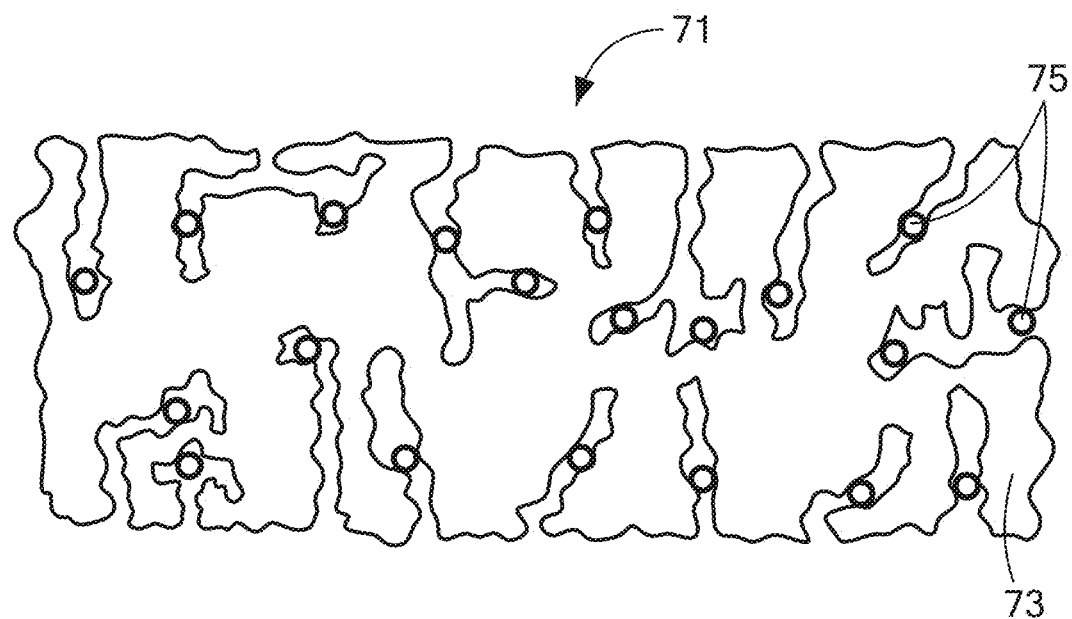
FIG. 4 is a schematic side view of a comparative sheet product to the microporous sheet product of FIG. 2, the comparative sheet product being made using an extrusion mixture lacking a compatibilizing agent, the comparative sheet product being shown prior to being imbibed with a polar or ion-containing liquid.
Figure 5:
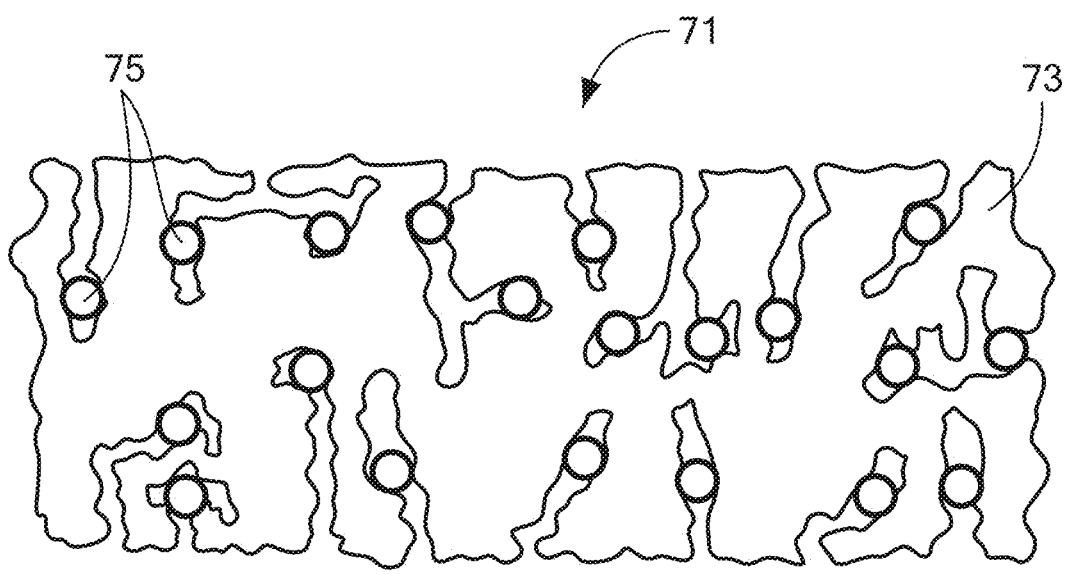
FIG. 5 is a schematic side view of the comparative sheet product of FIG. 4, the comparative sheet product being shown subsequent to being imbibed with a polar or ion-containing liquid.

By contrast, FIGS. 4 and 5 show a microporous sheet product 71 that was made from an extrusion mixture lacking a compatibilizing agent. As can be seen, although microporous sheet product 71 also comprises a matrix of thermoplastic polymer 73 and a plurality of superabsorbent polymer particles 75 dispersed in the matrix of thermoplastic polymer 73, microporous sheet product 71 has a more closed-cell structure than does microporous sheet product 51. Moreover, as seen best in FIG. 5, when microporous sheet product 71 is exposed to a polar or ion-containing liquid, such as the liquid electrolyte of a storage battery, substantially none of the superabsorbent polymer particles 75 migrate from within the matrix of thermoplastic polymer 73 to the exterior surfaces thereof.

Without wishing to be limited to any particular theory behind the invention, it is believed that the following discussion may shed some light on how the invention may function when exposed to a polar or ion-containing liquid, particularly as it applies to the use of the invention as a battery separator. Electrolyte and water retention of membranes are controlled by the wettability of the membrane and the pore structure of the membrane. Smaller pore sizes of the membrane create higher capillary action, thus higher liquid retention. The microporous sheet product of the present invention not only comprises small pores, it also has the ability to absorb and to store liquid in the created interstices within the superabsorbent, such capillary absorption retaining electrolyte and liquids. The combination of molecular pores and the chemical structure of the superabsorber, providing the active groups within the superabsorber molecules, aid in retention of electrolyte over the electrode faces and maintain electrolytic activity over the whole electrode surface. Absorption of electrolyte requires some degree of cross-linking within the polymer structure, this limits solvation of the superabsorbent polymer within the porous membrane structure; however, the swelling of the superabsorber creates hydrostatic pressure and may fill the capillaries and pores with swelled superabsorber. The superabsorber may also migrate or expand onto the membrane surface to improve liquid absorption and wetting capability. Furthermore, the swelling of the superabsorber polymer may fill larger pinholes after absorbing electrolyte, thus preventing direct short circuiting between the electrodes within a cell. The superabsorber may absorb up to 500 times of its own weight or 500 times its volume.

The microporous sheet product of the present invention may consist of a single layer of the type described above or may comprise a plurality of stacked or laminated layers, one or more of which may be of the type described above. A laminate structure may be readily formed using conventional multi-sheet extrusion head devices (e.g. co-extrusion). Examples of multilayer structures are described in European Patent Application Publication No. EP1,911,352 A1, published Apr. 16, 2008, which is incorporated herein by reference. One or more of the layers of a multilayer structure may be a protective layer, which may be non-porous to limit the permeability of pathogens or other detrimental microorganisms and to improve film durability. Alternatively, the multilayer structure may comprise a middle layer comprising a superabsorbent polymer and microporous outer layers not including the superabsorbent polymer. As the SAP swells upon exposure to electrolyte, it may migrate from the middle layer into an adjacent outer layer, promoting overall electrolyte wetting and conductivity. In addition to not containing a superabsorbent polymer, the composition of the outer layers may differ substantially from that of the inner layer, or, alternatively, the absence of a superabsorbent polymer may be the only compositional difference. In any event, the materials used in the various layers should be sufficiently compatible and miscible to permit adhesion during extrusion and juxtaposition of the layers.

Figure 6:
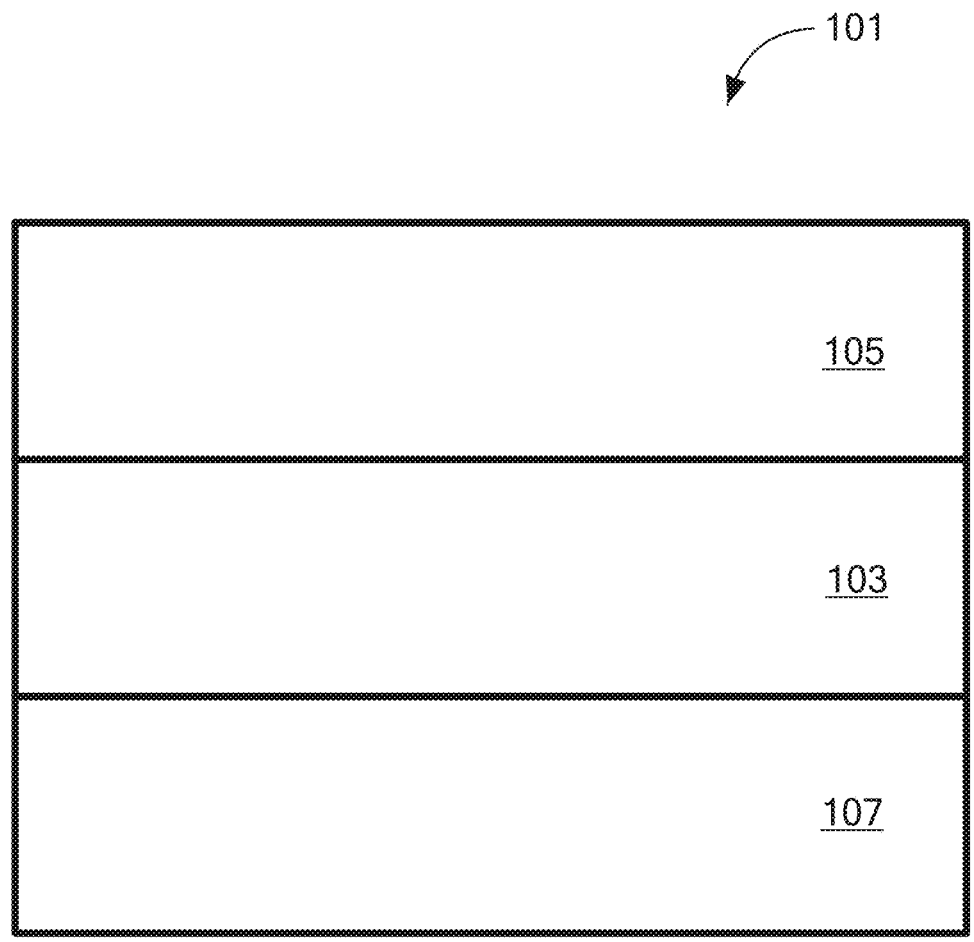
FIG. 6 is a schematic side view of a multi-layer microporous sheet product constructed according to the present invention.

Referring now to FIG. 6, there is shown a schematic side view of a multilayer microporous sheet product constructed according to the present invention, the multilayer microporous sheet product being represented generally by reference numeral 101.

Multilayer microporous sheet product 101 comprises an inner layer 103 and a pair of outer layers 105 and 107, with inner layer 103 being sandwiched between outer layers 105 and 107. Inner layer 105 may be identical in composition to microporous sheet product 51. Outer layers 105 and 107 may be identical to one another and may differ from inner layer 107 only in that outer layers 105 and 107 do not include a superabsorbent polymer. Outer layers 105 and 107 may be microporous.

Layers 103, 105 and 107 may be laminated together, for example, by co-extrusion.

As can be appreciated, although multilayer microporous sheet product 101 is of the BAB variety (layer A including the superabsorbent polymer and layer B not including the superabsorbent polymer), multilayer microporous sheet product 101 may be of the ABA variety, the AB variety, the ABC variety (with layer C differing in composition from both layers A and B), the ABCD variety (with layer D differing in composition from layers A, B and C), or other permutations.

In addition to use as a battery separator, the above-described microporous membrane may be put to other uses. For some such uses, the membrane may be used without any further modification thereto whereas, for other uses, the membrane is preferably modified in some manner. One way in which the membrane may be modified is by being imbibed with a material that endows the membrane with a specific function. The imbibing material may be a liquid or a dispersion of solid. Certain applications may require two or more reactive components as imbibing materials to permit the reaction of the reactive components within the microporous sheet structure. Examples of imbibing materials include medicaments, fragrances, flavorings, colorants, antistatic agents, surfactants, antimicrobials, pesticides and solid particulate material, such as activated carbon and pigments.

The microporous sheet product of the present invention may be laminated to any of a variety of other structures, such as nonwoven, porous, and non-porous sheet materials, to provide a composite structure. Nonwoven materials may include, but are not limited to, glass, cellulose, polyolefins, polyamide, polyester and other polymers. Lamination may be accomplished by conventional techniques, such as coating, impregnation, adhesive bonding, spot-welding, or by other techniques which do not destroy or otherwise interfere with porosity or which do not create undesirable porosity or perforations.

The microporous sheet product of the present invention may be employed in any of a wide variety of situations where microporous structures may be utilized. The microporous sheet product may be used in the ultrafiltration of colloidal matter, for example, as diffusion barriers. The membrane may be used as a geo-membrane, as a non-woven protective scrim, disposable garment, or diaper, which may take advantage of moisture absorption from perspiration, and as disposable gloves.

Another application of the microporous membrane may be in the field of food packaging, such as in uncooked meat packaging, cooked meat and sausage casing, cheese packaging and specific applications thereof, to provide flavor transfer and to promote adhesion. Other applications may be fresh meat packaging, such as chicken shrink bags and ground beef and pork display tray liners, to absorb excess processing fluids. Often packaged foods tend to expel moisture or blood from their solid structure over time. Since the membranes described herein contain superabsorbers within a microporous structure permitting moisture to be absorbed instantaneously, the occurrence of pooled liquids within the food packaging may be minimized. Other applications may include packaging for fresh produce and bread, where equilibria of moisture, oxygen, and carbon dioxide levels should be attained to keep these foods fresh for a longer shelve life.

Depending on the type of superabsorbent polymer, the SAP may absorb organic or aqueous liquids with a pH of 1 to 14. Some examples are listed in Example 4 below. Liquid smoke flavor and color additives are especially useful in cook-in food casing applications, where flavors can be absorbed and desorbed onto meat products. A typical liquid smoke extract is Poly100 from Hickory Specialties. Liquid smoke extract in the acidic state may be neutralized to a basic pH to improve the absorption of superabsorbent.

Still another possible application of the microporous sheet product of the present invention is with lithium ion electrochemical cells. More specifically, by neutralizing a polyacrylate with lithium hydroxide and then cross-linking the polymer, a special version of lithium polyacrylate can be produced. The cross-linked lithium polyacrylate sheet may also be formed in situ, for example, by the replacement of the sodium ion (of a sodium polyacrylate) with a lithium ion within a lithium electrolyte or battery. This cross-linked lithium polyacrylate separator may be especially compatible with the lithium ion electrochemical cells, facilitating the transport of the lithium ions between electrodes and, in so doing, reducing ionic resistivity.

The following examples are given for illustrative purposes only and are not meant to be a limitation on the invention described herein or on the claims appended hereto. All parts and percentages given in the description, examples and claims appended hereto are by volume unless otherwise stipulated. Further, all ranges of numbers provided herein above shall be deemed to specifically disclose all subset ranges of numbers within each given range.

In the case of electrochemical cell separator, the guiding principle for determination of optimal composition is highest conductivity in alkaline electrolyte while demonstrating desirable physical and mechanical characteristics. All samples below were processed similarly, with the material mixture processed in prior described sequence via a co-rotating twin screw extruder. The extruder was set at a temperature of 100° C. at the feed zone, 200° C. at the melt zone, the extruder was vented prior to the pumping section, the extruder pumping section and die were set at 180° C. The melt extrudate was cast onto a cast roller set at 40° C., with the total extrusion rate of 4 kg/hr, the cast roller having a takeoff speed of 4 ft/min.

Materials:
Materials used in the formation of the sheet product include:
Polyethylene—LLDPE GA601 from Lyondell Basell or HDPE 2908 from Nova Chemicals
Polypropylene—F006EC2 from Braskem
Polyamide—Nylon Grilamid L25 from EMS Chemie AG
Superabsorbent Polyacrylate Materials from Arkent or Aquasorb
Silica—Sipemat 50s from Evonic
Mineral spirits—Kaydol from Sonneborn
EVA NA362006 from Lyondell Bassell
Polyox—WSE308 Polyethylene oxide from Dow Chemical
PEG 600 from Dow Chemical
Span 80 and Tween 60 surfactants from Croda Equipment:
Balance—OHaus I-10 2.5 kg balance
Blender—Ross planetary blender, Hobart, model 3943
Fluid pump—Neptune, model 515AN3
Screw feeder—K-Ton Corp., model K2MVS60
Extruder—Coperion twin screw, model ZSK30
Cast film take-up—Davis Standard Company
Bi-orientation tenter frame—Marshall and Williams Compositions with a cross-linked polyacrylate superabsorber were examined for single layer membranes with a principal backbone of polyolefin or polyamide. Multilayer sheets were made with polyacrylate superabsorber contained in the inner layer, and outer layers formed from microporous polyamide, polyolefin, or combinations thereof.

Example 1

Each of samples A1, A2, A3, B1, B2 and B3 represents a membrane comprising polyamide and superabsorber. The composition and performance of each sample are shown below in Table 1.

TABLE 1

| Sample | A1 | A2 | A3 | B1 | B2 | B3 |
|---|---|---|---|---|---|---|
| Polyamide 6 or 612 | 66% | 66% | 66% | 59% | 59% | 59% |
| Superabsorbent | 13% | 13% | 13% | 17% | 17% | 17% |
| Silica | 3% | 3% | 3% | 2% | 2% | 2% |
| Surfactant | 16% | 16% | 16% | 11% | 11% | 11% |
| EVA NA362005 | 0% | 0% | 0% | 8% | 8% | 8% |
| Polyox | 2% | 2% | 2% | 3% | 3% | 3% |
| Total | 100% | 100% | 100% | 100% | 100% | 100% |
| Stretch treatment, % | 0% | 300% TD | 300% TD | 0% | 300% TD | 300% TD |
| Original thickness, mm | 0.180 | 0.132 | 0.102 | 0.390 | 0.265 | 0.200 |
| Original wt, mg/cm$^2$ | 7.9 | 4.6 | 4.0 | 26.8 | 12.8 | 9.9 |
| Average weight gain, 24 h RT, % | 46% | 42% | −9% | 37% | 81% | 37% |
| Average thickness gain, 24 h RT, % | −11% | 7% | 115% | −1% | 14% | 97% |
| Weight gain after 70 C., % | 36% | 32% | −3% | 35% | 62% | 27% |
| Thickness gain after 70 C., % | −8% | 8% | 240% | −2% | 21% | 172% |
| Resistance, R, in 30% KOH, Ω cm$^2$ | 6.8 | 8.3 | 6.8 | 10.4 | 3.2 | 2.8 |
| Resistivity, ρ, Ω cm | 424 | 614 | 615 | 276 | 109 | 119 |

Thickness was measured using a Mitutoyo 1D-C112EXB Thickness Gauge. Thickness gain percent of the separator was calculated by measuring the thickness before and after soaking in an electrolyte liquid. Similarly, the weight gain percent of the separator sample was calculated by measuring the weight of a sample before and after soaking (for a specific time) in an electrolyte liquid.

The resistivity of the separator was measured by placing a separator in a pair of electrodes immersed in 30% KOH electrolyte. The electrodes were connected to an HP 4338B Milliohm Meter. When the resistance was measured by the HP meter, with and without a separator, this difference was the resistance, recorded in ohm-cm-sq. By dividing the resistance by the thickness of the separator, this normalized the reading, or recorded in ohm-cm as the resistivity of the separator.

Example 2

Each of samples C1, C2, D1, D2, E1 and E2 represents a membrane comprising polyolefin and superabsorber. The composition and performance of each sample are shown below in Table 2.

TABLE 2

| Sample | C1 | C2 | D1 | D2 | E1 | E2 |
|---|---|---|---|---|---|---|
| LLDPE, GA601 | 66% | 66% | 68% | 68% | 51% | 51% |
| Superabsorbent | 17% | 17% | 21% | 21% | 17% | 17% |
| Silica | 2% | 2% | 1% | 1% | 4% | 4% |
| Surfactant | 6% | 6% | 2% | 2% | 14% | 14% |
| Mineral spirit | 6% | 6% | 3% | 3% | 4% | 4% |
| EVA NA362005 | 0% | 0% | 0% | 0% | 8% | 8% |
| Polyox | 3% | 3% | 6% | 6% | 3% | 3% |
| Total | 100% | 100% | 100% | 100% | 100% | 100% |
| Stretch treatment, % | 0% | 300% TD | 0% | 15% TD | 0% | 0% |
| Original thickness, mm | 0.225 | 0.150 | 0.345 | 0.340 | 0.320 | 0.341 |
| Original wt, mg/cm$^2$ | 12.8 | 5.6 | 20.0 | 21.4 | 17.6 | 19.7 |
| Average weight gain, 24 h RT, % | 6% | 47% | 22% | 31% | 34% | −6% |
| Average thickness gain, 24 h RT, % | −12% | 10% | −10% | −5% | −9% | 21% |
| Weight gain after 70 C., % | 0% | 27% | 7% | 6% | 13% | −18% |
| Thickness gain after 70 C., % | −11% | 33% | −10% | −7% | −10% | 49% |
| Resistance, R, in 30% KOH, Ω cm$^2$ | 19.4 | 7.2 | 9.1 | 8.2 | 2.0 | 1.5 |
| Resistivity, ρ, Ω cm | 984 | 418 | 294 | 253 | 73 | 49 |

Example 3

Each of samples F1 and F2 had a co-extruded trilayer (BAB) structure. The inner layer (A) comprised polyamide as a principal component, with added cross-linked polyacrylate superabsorber, silica, surfactant, and polyox. Each of the outer layers (B) lacked superabsorbent and comprised polyamide, silica, surfactant and polyox. The co-extruded layers were adhered together at the extrusion die opening and were stretched and treated as a single membrane subsequently. This configuration of structural layers has the advantage of different properties on the surface or in the interior of the membrane. The inner layer of the structure absorbs electrolyte readily, allowing facile diffusion through the microporous outer layers. The microporous outer layers are protective layers that keep superabsorbent in and foreign materials out. The composition and performance of each sample are shown below in Table 3.

TABLE 3

| Sample | F1 | | F2 | |
|---|---|---|---|---|
| Layers in ABA structure | A | B | A | B |
| Polyamide 6 or 612 | 80% | 61% | 80% | 61% |
| Superabsorbent | 0% | 17% | 0% | 17% |
| Silica | 2% | 3% | 2% | 3% |
| Surfactant | 8% | 16% | 8% | 16% |
| Polyox | 11% | 2% | 11% | 2% |
| Total | 100% | 100% | 100% | 100% |
| Stretch treatment, % | None | | 300% TD | |
| Original thickness, mm | 0.27 | | 0.20 | |
| Original wt, mg/cm$^2$ | 18.6 | | 9.5 | |
| Average weight gain, 24 h RT | 29% | | 21% | |
| Average thickness gain, 24 h RT | 25% | | 85% | |
| Weight gain after 70 C., % | 8% | | 23% | |
| Thickness gain after 70 C., % | 13% | | 18% | |
| Resistance, R, in 30% KOH, Ω cm$^2$ | 16.5 | | 13.9 | |
| Resistivity, ρ, Ω cm | 594 | | 591 | |

Example 4

Each of samples G, H, I1, I2, J1 and J2 represents a membrane lacking a superabsorber. The composition and performance of each sample are shown below in Table 4. One may note the higher resistivity exhibited by these samples lacking the SAP.

TABLE 4

| | Sample ID | | | | | |
|---|---|---|---|---|---|---|
| Formulation v % | G | H | I1 | I2 | J1 | J2 |
| Polyamide 6 or 612 | 73% | 64% | 56% | 56% | 72% | 72% |
| LLDPE, GA601 | 0% | 0% | 4% | 4% | 0% | 0% |
| Superabsorbent | 0% | 0% | 0% | 0% | 0% | 0% |
| Silica | 7% | 9% | 0% | 0% | 3% | 3% |
| Surfactant | 0% | 0% | 0% | 0% | 14% | 14% |
| Polyox | 20% | 27% | 40% | 40% | 11% | 11% |
| Total | 100% | 100% | 100% | 100% | 100% | 100% |
| Stretch treatment, % | 0% | 0% | 0% | 215% TD | 0% | 300% TD |
| Original thickness, mm | 0.122 | 0.098 | 0.070 | 0.040 | 0.190 | 0.063 |
| Original wt, mg/cm2 | 14.8 | 12.1 | 4.9 | 2.6 | 11.3 | 4.5 |
| Average weight gain, 24 h RT, % | NA | NA | −5% | 17% | 12% | 49% |
| Average thickness gain, 24 h RT, % | NA | NA | 5% | 0% | −8% | 32% |
| Weight gain after 70 C., % | NA | NA | −6% | 19% | 9% | 31% |
| Thickness gain after 70 C., % | NA | NA | 34% | 7% | −8% | 51% |
| Resistance, R, in 30% KOH, Ωcm2 | 78.9 | 29.5 | 15.1 | 25.6 | 25.1 | 8.0 |
| Resistivity, r, Ωcm | 6470 | 3010 | 2397 | 6027 | 1392 | 951 |

Example 5

Each of samples L1, L2, M1 and M2 represents a membrane comprising polyamide and superabsorber. The membranes showed ability to gain in weight and thickness when in contact with various liquids. A gain with liquid smoke flavor extract is unexpected. The composition and performance of each sample are shown below in Table 5.

TABLE 5

| Material ID | L1 | L2 | M1 | M2 |
|---|---|---|---|---|
| TDO stretch % | none | 50% | none | 25% |
| Formulation: | | | | |
| SAP v % | 23% | 23% | 17% | 17% |
| PA v % | 70% | 70% | 59% | 59% |
| EVA v % | 0% | 0% | 8% | 8% |
| Polyox v % | 0% | 0% | 3% | 3% |
| Silica v % | 0% | 0% | 2% | 2% |
| Surfactant v % | 7% | 7% | 11% | 11% |
| Total | 100% | 100% | 100% | 100% |
| Absorbency | | | | |
| Weight gain % (30% KOH, pH 15) | 94% | 116% | 31% | 65% |
| Weight gain % (water pH 6) | 227% | 184% | 99% | 119% |
| Weight gain % (acetic acid pH 4) | 84% | 76% | 32% | 52% |
| Weight gain % (Liquid smoke pH 5) | 72% | 68% | 53% | 82% |
| Weight gain % (EC/DEC) | 4% | 70% | 3% | 54% |
| Weight gain % (mineral spirits) | 3% | 8% | 3% | 12% |
| Original thickness (mm) | 0.37 | 0.33 | 0.48 | 0.35 |
| Thickness gain % (30% KOH) | 22% | −3% | −3% | 19% |
| Thickness gain % (water pH 6) | 59% | 60% | 49% | 56% |
| Thickness gain % (acetic acid pH 4) | 32% | 32% | 25% | 22% |
| Thickness gain % (L smoke pH 5) | 23% | 21% | 23% | 18% |
| Thickness gain % (mineral spirits) | 2% | 5% | 2% | 3% |
| Resistance in 30% KOH Ω-cm^2 | 3.7 | 3.4 | 8.4 | 3.6 |
| Resistivity Ω-cm | 66 | 112 | 228 | 146 |
| Dry Porosity (%) | 4% | 9% | 4% | 13% |
| Wet Water Porosity (%) | 69% | 65% | 50% | 54% |
| Wet 30% KOH Porosity (%) | 42% | 47% | 19% | 34% |
| Dry Mean Pore Size (micron) | NA | 2.7 | NA | NA |
| Wet (water) Mean Pore Size (micron) | NA | <0.07 | NA | NA |
| SAP migrated to separator surface | | | | |
| in water (as wt % of sample) | 1.8% | NA | 12.7% | NA |
| in 30% KOH (as wt % of sample) | 17.6% | NA | 12.5% | NA |

The superabsorbent migration of the separator was measured by soaking the separator sample in a specific electrolyte for a prescribed time and temperature. The SAP migrated from within the separator onto the surface of the separator and solvated in the electrolyte. The surface SAP was scraped off the separator with a spatula after soaking. The separator sample was then dried at 120° C. The weight loss of the dry sample, before soaking and after removal of the surface SAP, was accounted for as the amount of the SAP that migrated from within the separator onto the surface of the separator.

It may be noted that sample L2 had different absorption weight gains with different electrolytes and solvents, ranging from 8% for mineral spirits to 184% for water. The 8% weight gain for mineral spirits reflects the amount of porosity of the existing dry separator sample, without electrolyte and the associated SAP swelling. By contrast, the 184% weight gain reflects the absorption of electrolyte by the SAP, increasing both the weight and the thickness of the separator. This separator is also capable of absorbing liquid smoke extract to a weight gain of 68% and EC/DEC lithium ion electrolyte to a weight gain of 70%. It may also be noted that the separator thickness for sample L2 increased by 60%.

Sample L2 also exhibited a pore size of 2.7 microns before exposure to water whereas, after exposure to water, the pore size decreased to below 0.07 micron. This is believed to have occurred because, after absorption of water by the superabsorbent polymer, the superabsorbent polymer swelled and filled the separator capillaries with the swelled SAP, creating nanopores through the SAP in the process. The separator porosity was calculated to be 65% with water and demonstrated a resistivity of 112 ohm-cm with 30% KOH electrolyte. The un-stretched sample of L1 showed that, when soaked with water, 1.8% of the SAP migrated from within the separator onto the surface of the separator whereas, when the same sample was immersed in 30% KOH electrolyte, 17.6% of the SAP within the separator migrated to the surface of the separator. The L2 sample was processed with 7% surfactant having a solubility parameter above 11.

Example 6

Sample X represents a membrane comprising polyethylene and superabsorber whereas each of samples Y and Z represents a membrane comprising polyamide and superabsorber. The composition and performance of each sample are shown below in Table 6.

TABLE 6

| Sample | X | Y | Z |
|---|---|---|---|
| Polyethylene, Nova 2908 (wt %) | 78 | 0 | 0 |

TABLE 6-continued

| Sample | X | Y | Z |
|---|---|---|---|
| Polyamide, EMS CF6S (wt %) | 0 | 78 | 60 |
| SAP, AquaSorb AS50F (wt %) | 22 | 22 | 40 |
| Total (wt %) | 100 | 100 | 100 |
| SAP Migration (30% KOH soaked for 2 days) | | | |
| Separator Initial Weight (g) | 7.144 | 5.775 | 7.831 |
| Re-dried Weight (g) | 7.025 | 5.542 | 6.474 |
| SAP migrated (from separator to electrolyte) | 1.7% | 4.0% | 17.3% |
| Resistance Measurement | | | |
| Instrument Baseline (ohm-cm$^2$) | 5 | 5.1 | 5.1 |
| Average Sample Measurement (ohm-cm$^2$) | 150.0 | 85.5 | 12.9 |
| Thickness (mm) | 0.42 | 0.58 | 0.75 |
| Separator Resistivity (ohm-cm) | 3571 | 1474 | 172 |

Each of the above samples was observed under microscope after being soaked in KOH electrolyte and then re-dried. Sample X showed a majority of the SAP as clear particles that were still embedded within the separator. Sample Y showed a majority of the SAP particles became opaque or that the SAP migrated, creating porosity from electrolyte swell. Sample Z showed significant opacity of the separator, with a significant migration of SAP out of the pores, leaving micro craters.

The above data indicate that sample X (with PE and SAP) exhibited a KOH resistivity of 3571 ohm-cm, with 1.7 percent of the SAP being lost into the electrolyte. By contrast, samples Y and Z (each with polyamide and SAP) exhibited a much lower resistivity. In particular, sample Z, with 40% SAP, exhibited a significantly reduced resistivity and a much higher SAP migration onto the separator surface (17%).

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A microporous sheet product, the microporous sheet product made by a method comprising melt-extruding an extrusion mixture to produce a sheet material in film form and then cooling the sheet material, the extrusion mixture comprising a thermoplastic polymer, a superabsorbent polymer, and a compatibilizing agent, the compatibilizing agent promoting mixing of the thermoplastic polymer and the superabsorbent polymer and forming, by phase-separation, micropores in the sheet material, wherein the microporous sheet product is a single layer, wherein the microporous sheet product has capillary porosity suitable for liquid electrolyte conductivity, wherein the microporous sheet product, even without being stretched and/or even without having the compatibilizing agent removed, comprises an open-celled matrix of the thermoplastic polymer in which the superabsorbent polymer is dispersed, wherein the microporous sheet product is un-stretched, wherein the compatibilizing agent is retained in situ, and wherein a portion of the superabsorbent polymer migrates from within the open-celled matrix to an exterior surface of the open-celled matrix after exposure of the microporous sheet product to a polar or ion-containing liquid for absorption.

2. The microporous sheet product as claimed in claim 1 wherein the thermoplastic polymer comprises one or more thermoplastic polymers selected from the group consisting of polyolefins, polyamides, polyethylene terephthalate, polyacrylics, and polyvinyl acetate.

3. The microporous sheet product as claimed in claim 2 wherein the thermoplastic polymer comprises a polyolefin.

4. The microporous sheet product as claimed in claim 3 wherein the thermoplastic polymer comprises a polyethylene.

5. The microporous sheet product as claimed in claim 2 wherein the thermoplastic polymer comprises a polyamide.

6. The microporous sheet product as claimed in claim 1 wherein the thermoplastic polymer constitutes about 15-80% by volume of the extrusion mixture.

7. The microporous sheet product as claimed in claim 1 wherein the superabsorbent polymer comprises one or more superabsorbent polymers selected from the group consisting of cross-linked polyacrylates, methacrylates, polyacrylamides, carboxymethyl celluloses, polyvinyl alcohol copolymers, polyethylene oxides, starch-grafted copolyacrylates or polyacrylamides, and ethylene maleic anhydride copolymers.

8. The microporous sheet product as claimed in claim 7 wherein the superabsorbent polymer comprises a cross-linked polyacrylate.

9. The microporous sheet product as claimed in claim 1 wherein the superabsorbent polymer is in particle form and has a particle size smaller than about 30 microns.

10. The microporous sheet product as claimed in claim 9 wherein the superabsorbent polymer has a particle size of between 1 to 10 microns.

11. The microporous sheet product as claimed in claim 1 wherein the superabsorbent polymer constitutes about 1-80% by volume of the extrusion mixture.

12. The microporous sheet product as claimed in claim 11 wherein the superabsorbent polymer constitutes about 22-40% by volume of the extrusion mixture.

13. The microporous sheet product as claimed in claim 1 wherein the compatibilizing agent is selected from the group consisting of plasticizers and surfactants.

14. The microporous sheet product as claimed in claim 13 wherein the plasticizer is selected from the group consisting of polyethylene oxide, polyethylene glycol, hydroxypropylene, phthalates, mineral oil, and mineral spirits.

15. The microporous sheet product as claimed in claim 1 wherein the compatibilizing agent is mineral spirits.

16. The microporous sheet product as claimed in claim 1 wherein the compatibilizing agent constitutes about 1-80% by volume of the extrusion mixture.

17. The microporous sheet product as claimed in claim 16 wherein the compatibilizing agent constitutes about 10-50% by volume of the extrusion mixture.

18. The microporous sheet product as claimed in claim 1 wherein the thermoplastic polymer constitutes about 15-80% by volume of the extrusion mixture, wherein the superabsorbent polymer constitutes about 1-80% by volume of the extrusion mixture, and wherein the compatibilizing agent constitutes about 1-80% by volume of the extrusion mixture.

19. The microporous sheet product as claimed in claim 1 wherein the extrusion mixture further comprises an inorganic oxide.

20. The microporous sheet product as claimed in claim 19 wherein the inorganic oxide constitutes up to about 20% by volume of the extrusion mixture.

21. The microporous sheet product as claimed in claim 1 wherein the superabsorbent polymer has a solubility parameter above 11 and wherein at least one of the thermoplastic material and the compatibilizing agent has a solubility parameter above 11.

22. The microporous sheet product as claimed in claim 21 wherein the thermoplastic polymer has a solubility parameter above 11.

23. The microporous sheet product as claimed in claim 21 wherein the compatibilizing agent has a solubility parameter above 11.

24. The microporous sheet product as claimed in claim 1 wherein the microporous sheet product has a resistivity below 1,000 ohm-cm as tested in a 30% KOH solution.

25. The microporous sheet product as claimed in claim 24 wherein the microporous sheet product has a resistivity below about 500 ohm-cm as tested in a 30% KOH solution.

26. The microporous sheet product as claimed in claim 25 wherein the microporous sheet product has a resistivity below 100 ohm-cm as tested in a 30% KOH solution.

27. The microporous sheet product as claimed in claim 1 wherein the microporous sheet product experiences a weight loss of at least 20% of the superabsorbent polymer when soaked in 30% KOH solution for 2 days.

28. The microporous sheet product as claimed in claim 1 wherein the microporous sheet product has an average pore size below 5 microns.

29. The microporous sheet product as claimed in claim 1 wherein the microporous sheet product increases in thickness by at least 5% after exposure to a liquid for absorption.

30. The microporous sheet product as claimed in claim 1 wherein the melt-extruding comprises feeding the extrusion mixture into a first barrel of an extruder and injecting a liquid plasticizer into a subsequent barrel of the extruder and evacuating any potential volatiles using an open barrel of the extruder.

31. The microporous sheet product as claimed in claim 1 wherein the compatibilizing agent is mineral oil.

32. The microporous sheet product as claimed in claim 1 wherein the superabsorbent polymer is in particle form and has a particle size, wherein the microporous sheet product has a pore size, and wherein the particle size of the superabsorbent polymer is greater than the pore size of the microporous sheet product.

33. The microporous sheet product as claimed in claim 1 wherein the cooling comprises immersing the sheet material in a cooling bath.

34. The microporous sheet product as claimed in claim 1 wherein the superabsorbent polymer comprises a functional cation.

35. A microporous sheet product, the microporous sheet product made by a method comprising melt-extruding an extrusion mixture to produce a sheet material in film form and then cooling the sheet material, the extrusion mixture consisting of a thermoplastic polymer, a superabsorbent polymer, and a compatibilizing agent, wherein the superabsorbent polymer is a cross-linked lithium polyacrylate, the compatibilizing agent promoting mixing of the thermoplastic polymer and the superabsorbent polymer and forming, by phase-separation, micropores in the sheet material, wherein the microporous sheet product is a single layer, wherein the microporous sheet product has capillary porosity suitable for liquid electrolyte conductivity, wherein the microporous sheet product, even without being stretched and/or even without having the compatibilizing agent removed, comprises an open-celled matrix of the thermoplastic polymer in which the superabsorbent polymer is dispersed, and wherein a portion of the superabsorbent polymer migrates from within the open-celled matrix to an exterior surface of the open-celled matrix after exposure of the microporous sheet product to a polar or ion-containing liquid for absorption.

36. The microporous sheet product as claimed in claim 35 wherein the method further comprises removing the compatibilizing agent from the sheet material.

37. The microporous sheet product as claimed in claim 36 wherein the step of removing the compatibilizing agent comprises vaporizing the compatibilizing agent.

38. The microporous sheet product as claimed in claim 36 wherein the microporous sheet product has at least 10% of its volume in capillary porosity as micropores.

39. A method of separating the electrodes of a battery, the method comprising positioning the microporous sheet product of claim 36 between the electrodes.

40. A method of preparing a food packaging material, the method comprising the steps of:
  (a) providing the microporous sheet product of claim 1; and
  (b) then, imbibing the microporous sheet product with a liquid smoke extract flavoring.

41. A food packaging material made by the method of claim 40.

42. A multilayer sheet product, the multilayer sheet product comprising a plurality of stacked layers, wherein at least one of the stacked layers is the microporous sheet product of claim 1.

43. A multilayer sheet product, the multilayer sheet product comprising a first layer and a second layer, the first layer and the second layer being in direct contact with one another, the first layer comprising the microporous sheet product of claim 1, the second layer being devoid of a superabsorbent polymer.

44. A method of packaging a food item, the method comprising contacting the food item with the microporous sheet product of claim 1.

45. A multilayer sheet product, the multilayer sheet product comprising a first layer and a second layer, the first layer and the second layer being in direct contact with one another, the first layer comprising the microporous sheet product of claim 1, the second layer being a nonwoven structure.

46. The multilayer sheet product as claimed in claim 43 wherein a portion of the superabsorbent polymer migrates from the first layer to the second layer after exposure of the multilayer sheet product to a polar or ion-containing liquid for absorption.

* * * * *